United States Patent
Sanderovich et al.

(10) Patent No.: US 10,582,455 B2
(45) Date of Patent: Mar. 3, 2020

(54) SYSTEM AND METHOD FOR REDUCING INTERFERENCE FROM NEIGHBORING WIRELESS DEVICES

(71) Applicant: QUALCOMM Incorporated, San Diego, CA (US)

(72) Inventors: Amichai Sanderovich, Atlit (IL); Alecsander Petru Eitan, Haifa (IL); Assaf Yaakov Kasher, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/679,049

(22) Filed: Aug. 16, 2017

(65) Prior Publication Data

US 2018/0063794 A1    Mar. 1, 2018

Related U.S. Application Data

(60) Provisional application No. 62/382,707, filed on Sep. 1, 2016, provisional application No. 62/382,170, filed on Aug. 31, 2016.

(51) Int. Cl.
*H04W 52/24* (2009.01)
*H04W 74/08* (2009.01)
*H04B 17/373* (2015.01)

(52) U.S. Cl.
CPC ........ *H04W 52/243* (2013.01); *H04B 17/373* (2015.01); *H04W 74/0816* (2013.01)

(58) Field of Classification Search
CPC . H04W 74/0816; H04W 16/14; H04W 84/12; H04W 24/02; H04W 72/04;
(Continued)

(56) References Cited

U.S. PATENT DOCUMENTS

2009/0197590 A1* 8/2009 Borran ................ H04W 52/242
  455/423
2013/0148517 A1* 6/2013 Abraham ................ H04B 7/12
  370/252

(Continued)

FOREIGN PATENT DOCUMENTS

WO    WO-2012112801 A2    8/2012
WO    WO-2016011632 A1    1/2016

OTHER PUBLICATIONS

Partial International Search Report—PCT/US2017/047441—ISA/EPO—dated Oct. 19, 2017.

(Continued)

*Primary Examiner* — Philip Sobutka
(74) *Attorney, Agent, or Firm* — Loza & Loza, LLP/Qualcomm

(57) ABSTRACT

A technique is disclosed for reducing interference in a communication system including a plurality of wireless devices. A first device transmits a frame (e.g., an RTS frame or a CTS frame) to a second device, the frame including information from which a non-target third device may use to estimate potential interference at the first device based on a proposed transmission to a fourth device. The information includes at least one of an interference and sensitivity factor (ISF), transmit power, and reciprocity factor (a difference between an antenna receive gain and an antenna transmit gain). Using the information in the frame to estimate the potential interference at the first device, the third device may choose to proceed with the proposed transmission if the estimated potential interference is less than a threshold; or withdraw or modify the proposed transmission if the estimated potential interference is greater than or equal to a threshold.

38 Claims, 13 Drawing Sheets

(58) Field of Classification Search
CPC . H04W 72/085; H04W 28/06; H04W 52/241; H04W 52/265; H04W 52/243; H04W 24/08; H04W 24/10; H04W 28/18; H04W 72/082
USPC .................. 455/226.1, 423, 452.2, 67.11
See application file for complete search history.

(56) References Cited

U.S. PATENT DOCUMENTS

| | | |
|---|---|---|
| 2017/0078013 A1 | 3/2017 | Sanderovich et al. |
| 2017/0127450 A1 | 5/2017 | Luo et al. |

OTHER PUBLICATIONS

International Search Report and Written Opinion—PCT/US2017/047441—ISA/EPO—dated Feb. 19, 2018.

\* cited by examiner

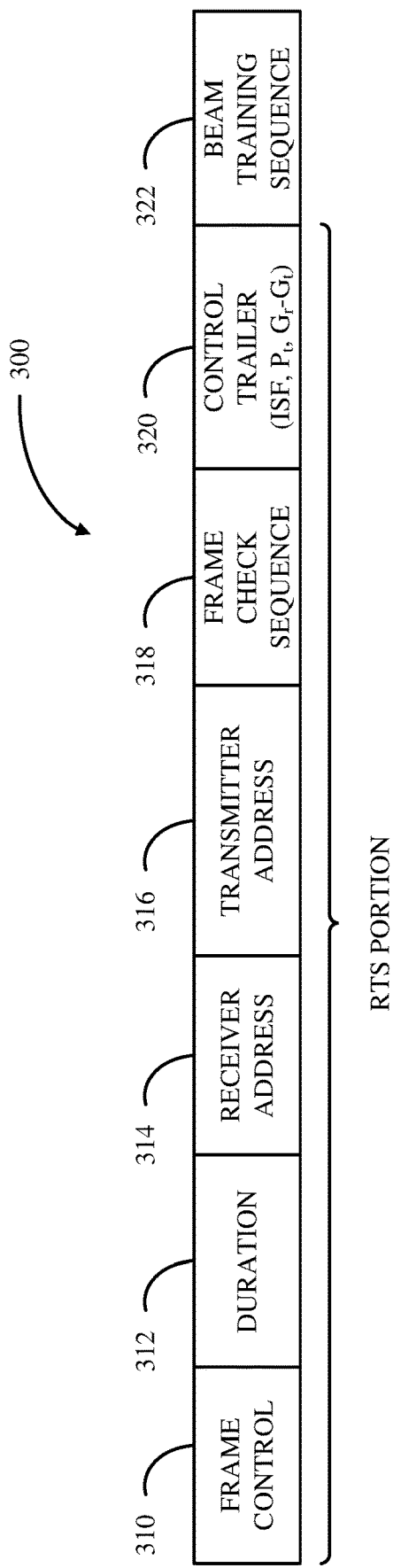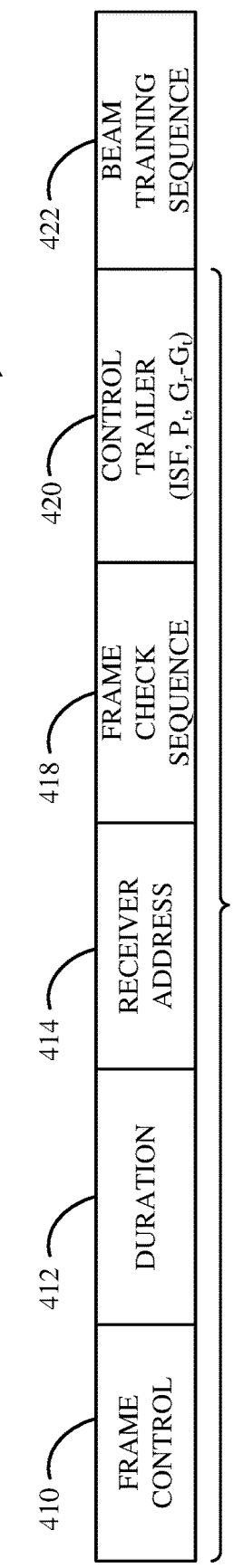
FIG. 3
FIG. 4

SYSTEM AND METHOD FOR REDUCING INTERFERENCE FROM NEIGHBORING WIRELESS DEVICES

CROSS REFERENCE TO RELATED APPLICATIONS

This application claims priority under 35 U.S.C. § 119(e) to U.S. Provisional Application Nos. 62/382,707 filed Sep. 1, 2016 and 62/382,170 filed Aug. 31, 2016, both entitled "SYSTEM AND METHOD FOR REDUCING INTERFERENCE FROM NEIGHBORING WIRELESS DEVICES." The disclosure of the prior applications are considered part of this application, and are hereby incorporated by reference.

FIELD

This disclosure relates generally to wireless communications, and in particular, to a system and method for reducing interference from neighboring wireless devices.

BACKGROUND

A communication system often includes three or more wireless devices configured to communicate with each other at various times. For instance, a first wireless device may participate in a communication session with a second wireless device. During this communication session, a third wireless device may desire to communicate with a fourth wireless device. If the third wireless device is sufficiently close to the first wireless device and/or the second wireless device, a transmission of a signal by the third wireless device intended for the fourth wireless device may produce interference at the first wireless device and/or the second wireless device. The interference may significantly impact the communication session between the first and second wireless devices.

SUMMARY

Certain aspects of the present disclosure provide an apparatus for wireless communications. The apparatus comprises a processing system configured to generate at least one frame including information from which at least one first wireless node is able to estimate a potential interference at the apparatus; an interface configured to output the at least one frame for transmission to at least one second wireless node.

Certain aspects of the present disclosure provide a method for wireless communications. The method comprises generating at least one frame including information from which a first wireless node is able to estimate a potential interference at an apparatus configured to transmit the at least one frame; and outputting the at least one frame for transmission to at least one second wireless node.

Certain aspects of the present disclosure provide an apparatus for wireless communications. The apparatus comprises means for generating at least one frame including information from which at least one first wireless node is able to estimate a potential interference at an apparatus; and means for outputting the at least one frame for transmission to at least one second wireless node.

Certain aspects of the present disclosure provide a computer readable medium having instructions stored thereon for generating at least one frame including information from which at least one first wireless node is able to estimate a potential interference at an apparatus configured to transmit the at least one frame; and outputting the at least one frame for transmission to at least one second wireless node.

Certain aspects of the present disclosure provide a first wireless node. The first wireless node comprises a processing system configured to generate at least one frame including information from which at least one second wireless node is able to estimate a potential interference at the first wireless node; and a transmitter configured to transmit the at least one frame to at least one third wireless node.

Certain aspects of the present disclosure provide an apparatus for wireless communications. The apparatus comprises an interface configured to receive at least one first frame from a first wireless node; and a processing system coupled to the interface and configured to estimate a potential interference at the first wireless node based on information in the at least one first frame and a proposed transmission scheme for transmitting at least one second frame to a second wireless node; and perform an operation based on the estimated potential interference.

Certain aspects of the present disclosure provide a method for wireless communications. The method comprises receiving at least one first frame from a first wireless node; estimating a potential interference at the first wireless node based on the information in the at least one first frame and a proposed transmission scheme for transmitting at least one second frame to a second wireless node; and performing an operation based on the estimated potential interference.

Certain aspects of the present disclosure provide an apparatus for wireless communications. The apparatus comprises means for receiving at least one first frame from a first wireless node; means for estimating a potential interference at the first wireless node based on information in the at least one first frame and a proposed transmission scheme for transmitting at least one second frame to a second wireless node; and means for performing an operation based on the estimated potential interference.

Certain aspects of the present disclosure provide a computer readable medium having instructions stored thereon for: receiving at least one first frame from a first wireless node; estimating a potential interference at the first wireless node based on information in the at least one first frame and a proposed transmission scheme for transmitting at least one second frame to a second wireless node; and performing an operation based on the estimated potential interference.

Certain aspects of the present disclosure provide a wireless node. The wireless node comprises a receiver configured to receive at least one first frame from a first wireless node; and a processing system coupled to the receiver configured to estimate a potential interference at the first wireless node based on information in the at least one first frame and a proposed transmission scheme for transmitting at least one second frame to a second wireless node, and perform an operation based on the estimated potential interference.

Aspects of the present disclosure also provide various methods, means, and computer program products corresponding to the apparatuses and operations described above.

BRIEF DESCRIPTION OF THE DRAWINGS

FIG. 3 illustrates a diagram of an exemplary modified Request to Send (RTS) frame in accordance with another aspect of the present disclosure.

FIG. 4 illustrates a diagram of an exemplary modified Clear to Send (CTS) frame in accordance with another aspect of the present disclosure.

DETAILED DESCRIPTION

Figure 1:
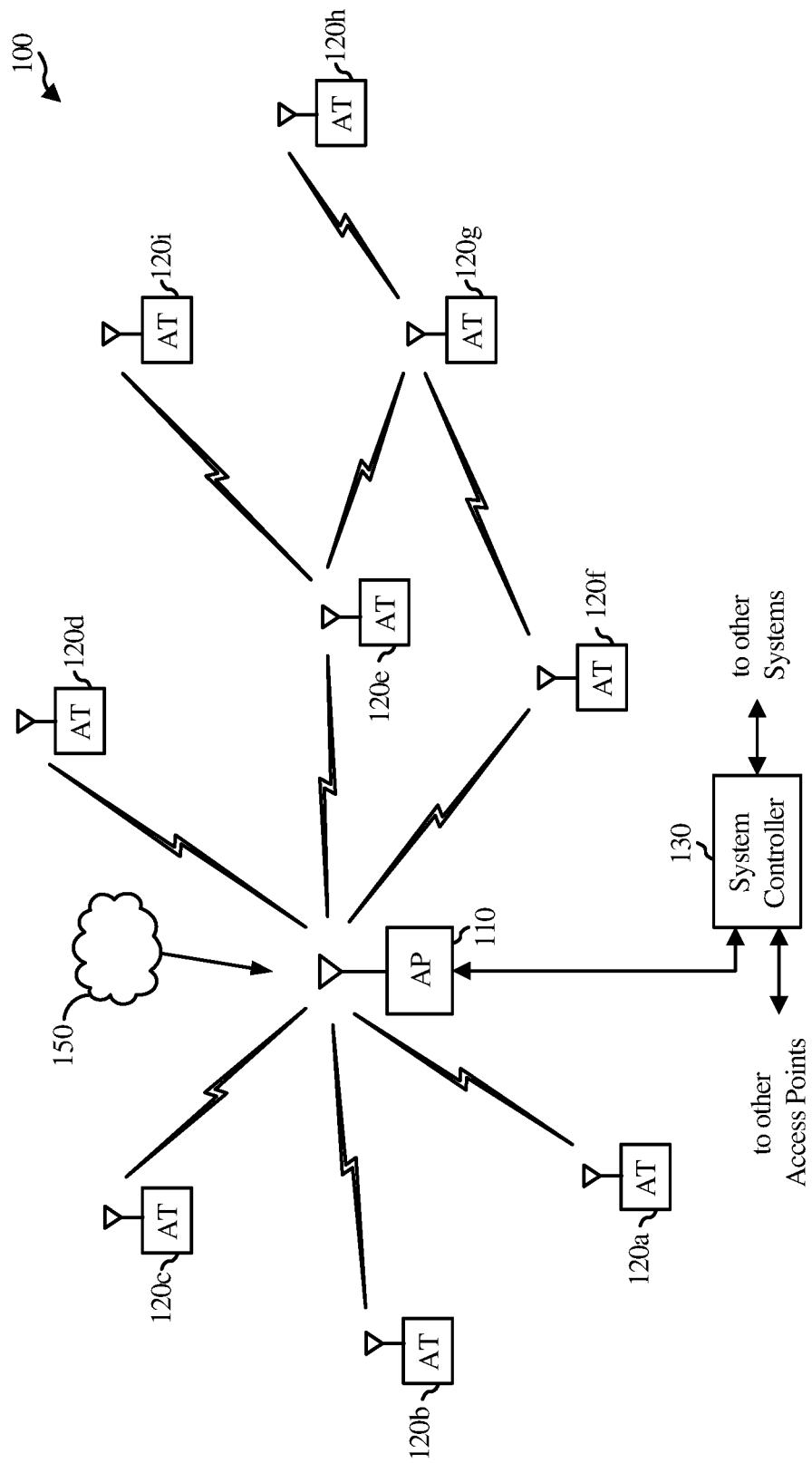
FIG. 1 illustrates a block diagram of an exemplary wireless communication system in accordance with an aspect of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. For example, the transmission protocols may include institute of electrical and electronic engineers (IEEE) 802.11 protocol. In some aspects, the 802.11 protocol may include the 802.11ay and/or the 802.11ad protocols, as well as future protocols. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple access terminals. A TDMA system may allow multiple access terminals to share the same frequency channel by dividing the transmission signal into different time slots, each time slot being assigned to different access terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a block diagram of an exemplary wireless communication system 100 with a plurality of wireless nodes, such as access points (APs) 110 and access terminals (ATs) 120. For simplicity, only one access point 110 is shown. An access point 110 is generally a fixed station that communicates with access terminals 120 and may also be referred to as a base station or some other terminology. An access terminal 120 may be fixed or mobile, and may be referred to as a mobile station, a wireless device or some other terminology. The access point 110 may communicate with one or more access terminals 120a to 120i at any given moment on the downlink and uplink. The downlink (i.e., forward link) is the communication link from the access point 110 to the access terminals 120, and the uplink (i.e., reverse link) is the communication link from the access terminals 120 to the access point 110. An access terminal 120 may also communicate peer-to-peer with another access terminal 120. A system controller 130 couples to and provides coordination and control for the access points 110. The access point 110 may communicate with other devices coupled to a backbone network 150.

In one example, the wireless communication system 100 utilizes direct sequence spread spectrum (DSSS) modulation techniques in communication between the access point 110 and access terminals 120. The use of spread spectrum techniques allows for the system to readily manage and operate longer inter symbol interference (ISI) channels. In particular, code division multiple access (CDMA), readily facilitates increases in user capacity in systems of this size as compared to conventional cellular systems. More specifically, the access point 110 may be within a predefined geographical region, or cell, using several modulator-demodulator units or spread-spectrum modems to process communication signals. During typical operations, a modem in the access point 110 is assigned to each access terminal 120 as needed to accommodate transfer of communication signals. If the modem employs multiple receivers, then one modem accommodates diversity processing, otherwise multiple modems may be used in combination.

Figure 2:
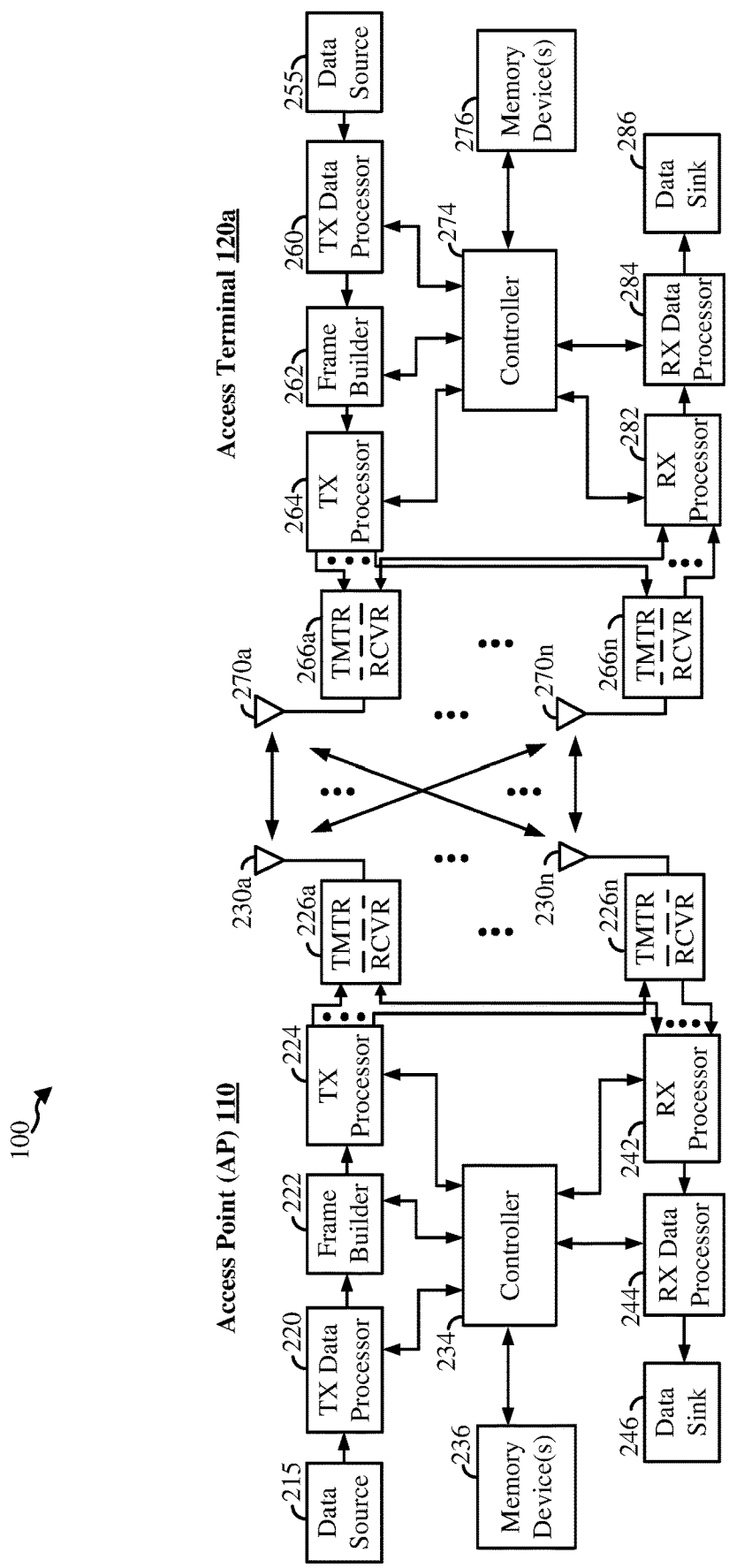
FIG. 2 illustrates a block diagram of an exemplary access point and user terminal in accordance with another aspect of the present disclosure.

FIG. 2 illustrates a block diagram of the access point 110 (generally, a first wireless node) and an access terminal 120, for example, one of the access terminals 120a (generally, a second wireless node) in the wireless communication system 100. The access point 110 is a transmitting entity for the downlink and a receiving entity for the uplink. The access terminal 120a is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel.

For transmitting data, the access point 110 comprises a transmit data processor 220, a frame builder 222, a transmit processor 224, a plurality of transceivers 226a through 226n, a bus interface for connecting the illustrated devices and components, and a plurality of antennas 230a through 230n. The access point 110 also comprises a controller 234 for controlling operations of the access point 110. In one embodiment, antennas 230a through 230n form a multi antenna phased array for multiple, steerable beams that can be directed to specific users. In this embodiment, isolation between users may be increased using the antenna array. The antennas may also be configured for equal gain beamforming (EGB) techniques and null steering techniques via phase control.

In operation, the transmit data processor 220 receives data (e.g., data bits) from a data source 215, and processes the data for transmission. For example, the transmit data processor 220 may encode the data (e.g., data bits) into encoded data, and modulate the encoded data into data symbols. The transmit data processor 220 may support different modulation and coding schemes (MCSs). For example, the transmit data processor 220 may encode the data (e.g., using low-density parity check (LDPC) encoding) at any one of a plurality of different coding rates. Also, the transmit data processor 220 may modulate the encoded data using any one of a plurality of different modulation schemes, including, but not limited to, binary phase-shift keying (BPSK), quadrature phase-shift keying (QPSK), quadrature amplitude modulation (QAM) (for example, 16QAM, 64QAM, and 256QAM), and amplitude and phase-shift keying or asymmetric phase-shift keying (APSK) (for example, 64APSK, 128APSK, and 256APSK).

In certain aspects, the controller 234 may send a command to the transmit data processor 220 specifying which modulation and coding scheme (MCS) to use (e.g., based on channel conditions of the downlink), and the transmit data processor 220 may encode and modulate data from the data source 215 according to the specified MCS. It is to be appreciated that the transmit data processor 220 may perform additional processing on the data such as data scrambling, and/or other processing. The transmit data processor 220 outputs the data symbols to the frame builder 222.

The frame builder 222 constructs, or generates, a frame (also referred to as a packet), and inserts the data symbols into a data payload of the frame. The frame may include a preamble, a header, and the data payload. In one embodiment, the frame is any of a beacon frame, a probe request frame, or a probe response frame. The frame may include interference information such as an interference sensitivity factor (ISF), transmit power, or a reciprocity factor, in the form of a class as described in greater detail below. The preamble may include a short training field (STF) sequence and a channel estimation field (CEF) sequence to assist the access terminal 120a in receiving the frame. The header may include information related to the data in the payload such as the length of the data and the MCS used to encode and modulate the data. This information allows the access terminal 120a to demodulate and decode the data. The data in the payload may be divided among a plurality of blocks, wherein each block may include a portion of the data and a guard interval (GI) to assist the receiver with phase tracking. The frame builder 222 outputs the frame to the transmit processor 224.

The transmit processor 224 processes the frame for transmission on the downlink. For example, the transmit processor 224 may support different transmission modes such as an orthogonal frequency-division multiplexing (OFDM) transmission mode and a single-carrier (SC) transmission mode. In this example, the controller 234 may send a command to the transmit processor 224 specifying which transmission mode to use, and the transmit processor 224 may process the frame for transmission according to the specified transmission mode. The transmit processor 224 may apply a spectrum mask to the frame so that the frequency constituent of the downlink signal meets certain spectral requirements.

In certain aspects, the transmit processor 224 may support multiple-output-multiple-input (MIMO) transmission. In these aspects, the access point 110 may include multiple antennas 230a through 230n and multiple transceivers 226a through 226n (e.g., one for each antenna). The transmit processor 224 may perform spatial processing on the incoming frames and provide a plurality of transmit frame streams for the plurality of antennas. The transceivers 226a through 226n receive and processes (e.g., converts to analog, amplifies, filters, and frequency upconverts) the respective transmit frame streams to generate transmit signals for transmission via the antennas 230a through 230n, respectively.

The transmit processor 224 may be configured to transmit a plurality of training signals associated with a transmit beamforming training portion of an 802.11 beamforming training protocol (e.g., 802.11ad, 802.11ay, or future beamforming training protocols) between the access point 110 and one or more access terminals 120a. In one example, the beamforming training protocol may include sector level sweep (SLS) and a beam refinement phase for transmission (BRP-Tx).

For transmitting data, the access terminal 120a comprises a transmit data processor 260, a frame builder 262, a transmit processor 264, a plurality of transceivers 266a through 266n, a bus interface for connecting the illustrated devices and components, and a plurality of antennas 270a through 270n (e.g., one antenna per transceiver). The access terminal 120a may transmit data to the access point 110 on the uplink, and/or transmit data to another access terminal 120 (e.g., for peer-to-peer communication). The access terminal 120a also comprises a controller 274 for controlling operations of the access terminal 120a. In one embodiment, antennas 270a through 270n form an antenna array for multiple, steerable beams that can be directed to specific users. In this embodiment, isolation between users may be increased using the antenna array. The antennas may also be configured for equal gain beamforming (EGB) techniques and null steering techniques via, for example, phase control.

In operation, the transmit data processor 260 receives data (e.g., data bits) from a data source 255, and processes (e.g., encodes and modulates) the data for transmission. The transmit data processor 260 may support different MCSs. For example, the transmit data processor 260 may encode the data (e.g., using LDPC encoding) at any one of a plurality of different coding rates, and modulate the encoded data using any one of a plurality of different modulation schemes, including, but not limited to, BPSK, QPSK, 16QAM, 64QAM, 64APSK, 128APSK, 256QAM, and 256APSK. In certain aspects, the controller 274 may send a command to the transmit data processor 260 specifying which MCS to use (e.g., based on channel conditions of the uplink), and the transmit data processor 260 may encode and modulate data from the data source 255 according to the specified MCS. It is to be appreciated that the transmit data processor 260 may perform additional processing on the data. The transmit data processor 260 outputs the data symbols to the frame builder 262.

The frame builder 262 constructs, or generates a frame, and inserts the received data symbols into a data payload of the frame. The frame may include a preamble, a header, and the data payload. In one embodiment, the frame is a beacon frame. The beacon frame may include interference information such as an interference sensitivity factor (ISF), transmit power, or a reciprocity factor, described in greater detail below. The preamble may include an STF sequence and a CEF sequence to assist the access point 110 and/or other access terminal 120 in receiving the frame. The header may include information related to the data in the payload such as the length of the data and the MCS used to encode and modulate the data. The data in the payload may be divided among a plurality of blocks where each block may include a portion of the data and a guard interval (GI) assisting the access point 110 and/or other access terminal 120 with phase tracking. The frame builder 262 outputs the frame to the transmit processor 264.

The transmit processor 264 processes the frame for transmission. For example, the transmit processor 264 may support different transmission modes such as an OFDM transmission mode and an SC transmission mode. In this example, the controller 274 may send a command to the transmit processor 264 specifying which transmission mode to use, and the transmit processor 264 may process the frame for transmission according to the specified transmission mode. The transmit processor 264 may apply a spectrum mask to the frame so that the frequency constituent of the uplink signal meets certain spectral requirements.

The transceivers 266a through 266n receive and process (e.g., converts to analog, amplifies, filters, and frequency upconverts) the output of the transmit processor 264 for transmission via the one or more antennas 270a through 270n. For example, the transceiver 266 may up-convert the output of the transmit processor 264 to a transmit signal having a frequency in the 60 GHz range.

In certain aspects, the transmit processor 264 may support multiple-output-multiple-input (MIMO) transmission. In these aspects, the access terminal 120 may include multiple antennas 270a through 270n and multiple transceivers 266a through 266n (e.g., one for each antenna). The transmit processor 264 may perform spatial processing on the incoming frame and provide a plurality of transmit frame streams for the plurality of antennas 270a through 270n. The transceivers 266a through 266n receive and process (e.g., converts to analog, amplifies, filters, and frequency upconverts) the respective transmit frame streams to generate transmit signals for transmission via the antennas 270a through 270n.

The transmit processor 264 may be configured to transmit a plurality of training signals associated with a transmit beamforming training portion of an 802.11 beamforming training protocol (e.g., 802.11ad, 802.11ay, or future beamforming training protocols) between the access point 110 and one or more access terminals 120a. In one example, the beamforming training protocol may include sector level sweep (SLS) and a beam refinement phase for transmission (BRP-Tx).

For receiving data, the access point 110 comprises a receive processor 242, and a receive data processor 244. In operation, the transceivers 226a through 226n receive a signal (e.g., from the access terminal 120a), and spatially process (e.g., frequency down-converts, amplifies, filters and converts to digital) the received signal. The received signal(s) may also be processed such that the phase and gain can be controlled with beamforming algorithms. The beamforming algorithms may control the phase (i.e., phase shifting) and gain of each antenna, and include linear spatial techniques, such as a channel correlation matrix inversion (CCMI) technique, a minimum mean square error (MMSE) technique, an equal gain beamforming technique, and others. The beamforming algorithms may also include space-time techniques, such as a minimum mean square error linear equalizer (MMSE-LE) technique, a decision feedback equalizer (DFE) technique, a maximal ratio combining technique (MRC), and others.

The receive processor 242 and the receive data processor 244 may be configured to receive a plurality of training signals associated with a transmit beamforming training portion of an 802.11 beamforming training protocol (e.g., 802.11ad, 802.11ay, or future beamforming training protocols) between the access point 110 and one or more access terminals 120a. For example, the beamforming training protocol may include sector level sweep (SLS) and a beam refinement phase for receiving (BRP-Rx).

The receive processor 242 receives the outputs of the transceivers 226a through 226n, and processes the outputs to recover data symbols. For example, the access point 110 may receive data (e.g., from the access terminal 120a) in a frame. In this example, the receive processor 242 may detect the start of the frame using the STF sequence in the preamble of the frame. The receiver processor 242 may also use the STF for automatic gain control (AGC) adjustment. The receive processor 242 may also perform channel estimation (e.g., using the CEF sequence in the preamble of the frame) and perform channel equalization on the received signal based on the channel estimation.

Further, the receiver processor 242 may estimate phase noise using the guard intervals (GIs) in the payload, and reduce the phase noise in the received signal based on the estimated phase noise. The phase noise may be due to noise from a local oscillator in the access terminal 120a and/or noise from a local oscillator in the access point 110 used for frequency conversion. The phase noise may also include noise from the channel. The receive processor 242 may also recover information (e.g., MCS scheme) from the header of the frame, and send the information to the controller 234. After performing channel equalization and/or phase noise reduction, the receive processor 242 may recover data symbols from the frame, and output the recovered data symbols to the receive data processor 244 for further processing.

The receive data processor 244 receives the data symbols from the receive processor 242 and an indication of the corresponding multi-scale control (MSC) scheme from the controller 234. The receive data processor 244 demodulates and decodes the data symbols to recover the data according to the indicated MSC scheme, and outputs the recovered data (e.g., data bits) to a data sink 246 for storage and/or further processing.

As discussed above, the access terminal 120a may transmit data using an OFDM transmission mode or a SC transmission mode. In this case, the receive processor 242 may process the receive signal according to the selected transmission mode. Also, as discussed above, the transmit processor 264 may support multiple-output-multiple-input (MIMO) transmission. In this case, the access point 110 includes multiple antennas 230a through 230n and multiple transceivers 226a through 226n (e.g., one for each antenna). Each transceiver receives and processes (e.g., frequency downconverts, amplifies, filters, and converts to digital) the signal from the respective antenna. The receive processor 242 may perform spatial processing on the outputs of the transceivers 226a through 226n to recover the data symbols.

For receiving data, the access terminal 120a comprises a receive processor 282, and a receive data processor 284. In operation, the transceivers 266a through 266n receive a signal (e.g., from the access point 110 or another access terminal 120) via the respective antennas 270a through 270n, and process (e.g., frequency downconverts, amplifies, filters and converts to digital) the received signal. The received signal(s) may also be processed such that the phase and gain can be controlled with beamforming algorithms. The beamforming algorithms may control the phase (i.e., phase shifting) and gain of each antenna, and include linear spatial techniques, such as a channel correlation matrix inversion (CCMI) technique, a minimum mean square error (MMSE) technique, an equal gain beamforming technique, and others. The beamforming algorithms may also include space-time techniques, such as a minimum mean square error linear equalizer (MMSE-LE) technique, a decision feedback equalizer (DFE) technique, a maximal ratio combining technique (MRC), and others.

The receive processor 282 and the receive data processor 284 may be configured to receive a plurality of training signals associated with a transmit beamforming training portion of an 802.11 beamforming training protocol (e.g., 802.11ad, 802.11ay, or future beamforming training protocols) between the access point 110 and one or more access terminals 120a. For example, the beamforming training protocol may include sector level sweep (SLS) and a beam refinement phase for receiving (BRP-Rx).

The receive processor 282 receives the outputs of the transceivers 266a through 266n, and processes the outputs to recover data symbols. For example, the access terminal 120a may receive data (e.g., from the access point 110 or another access terminal 120) in a frame, as discussed above. In this example, the receive processor 282 may detect the start of the frame using the STF sequence in the preamble of the frame. The receive processor 282 may also perform channel estimation (e.g., using the CEF sequence in the preamble of the frame) and perform channel equalization on the received signal based on the channel estimation.

Further, the receiver processor 282 may estimate phase noise using the guard intervals (GIs) in the payload, and reduce the phase noise in the received signal based on the estimated phase noise. The receive processor 282 may also recover information (e.g., MCS scheme) from the header of the frame, and send the information to the controller 274. After performing channel equalization and/or phase noise reduction, the receive processor 282 may recover data symbols from the frame, and output the recovered data symbols to the receive data processor 284 for further processing.

The receive data processor 284 receives the data symbols from the receive processor 282 and an indication of the corresponding MSC scheme from the controller 274. The receiver data processor 284 demodulates and decodes the data symbols to recover the data according to the indicated MSC scheme, and outputs the recovered data (e.g., data bits) to a data sink 286 for storage and/or further processing.

As discussed above, the access point 110 or another access terminal 120 may transmit data using an OFDM transmission mode or a SC transmission mode. In this case, the receive processor 282 may process the receive signal according to the selected transmission mode. Also, as discussed above, the transmit processor 224 may support multiple-output-multiple-input (MIMO) transmission. In this case, the access terminal 120a may include multiple antennas and multiple transceivers (e.g., one for each antenna). Each transceiver receives and processes (e.g., frequency downconverts, amplifies, filters, and converts to digital) the signal from the respective antenna. The receive processor 282 may perform spatial processing on the outputs of the transceivers to recover the data symbols.

As shown in FIG. 2, the access point 110 also comprises a memory device(s) 236 coupled to the controller 234. The memory device(s) 236 may store instructions that, when executed by the controller 234, cause the controller 234 to perform one or more of the operations described herein. Similarly, the access terminal 120a also comprises a memory device(s) 276 coupled to the controller 274. The memory device(s) 276 may store instructions that, when executed by the controller 274, cause the controller 274 to perform the one or more of the operations described herein. The memory device(s) 236 and 276 may store data to assist the access point 110 and access terminal 120a in estimating interference information at one or more neighboring devices, as described in more detail further herein.

FIG. 3 illustrates a diagram of an exemplary modified Request to Send (RTS) frame, or "RTS-TRN" frame 300 in accordance with another aspect of the present disclosure. A wireless device (referred to herein as an "originating device") may use an RTS frame to determine whether a communication medium is available to send one or more data frames to a "destination device." Typically, an RTS frame is sent when the size of the one or more data frames to be transmitted to the destination device exceeds a specified threshold. In response to receiving the RTS frame, the destination device sends a Clear to Send (CTS) frame back to the originating device if the communication medium available. In response to receiving the CTS frame, the originating device sends the one or more data frames to the destination device. In response to successfully receiving the one or more data frames, the destination device sends one or more Acknowledgement ("ACK") frames to the originating device. Such RTS frame, CTS frame, and ACK frame are examples of media access control (MAC) frames.

The MAC may include a carrier sense multiple access/ collision avoidance (CSMA/CA) based distributed coordination function (DCF) and a point coordination function (PCF). The DCF allows for access of a medium without central control. The PCF is deployed at an access point 110 to provide central control. The DCF and PCF utilize various gaps between consecutive transmissions to avoid collisions. Transmissions may be referred to as frames, and a gap between frames is referred to as an inter-frame spacing (IFS). Frames may be user data frames, control frames or management frames.

With regard to the frame details, the RTS-TRN frame 300 comprises an RTS portion including a frame control field 310, a duration field 312, a receiver address field 314, a transmitter address field 316, a frame check sequence field 318, and a control trailer field 320. As discussed in more detail herein, the control trailer 320 includes information that allows a neighboring (non-destination) device to estimate potential interference at the originating device if the neighboring device transmits a signal pursuant to a communication session. Such information may include at least one of an interference sensitivity factor (ISF), transmit power $P_t$, or a reciprocity factor $G_r - G_t$ (a difference between the antenna receive gain and the antenna transmit gain).

For improved communication and interference reduction purposes as discussed in more detail in U.S. Provisional Patent application, Ser. No. 62/273,397 (which is incorporated herein by reference), the RTS-TRN frame 300 further includes a beam training sequence field 322 for configuring respective antennas of the destination device and one or more neighboring devices. The destination device uses the beam training sequence field 322 to configure its antenna for directional reception from and transmission to the originating device. The one or more neighboring devices uses the beam training sequence field 322 to configure its antenna for transmission so as to reduce interference at the originating device, such as by configuring its transmit antenna radiation pattern to have nulls aimed substantially at the direction of the originating device. The beam training sequence in the beam training sequence field 322 may be based on a Golay sequence.

The RTS portion of the RTS-TRN frame 300 may be configured as a standard RTS frame specified in the institute of electrical and electronic engineers (IEEE) 802.11 protocols. In this regard, the frame control field 310 includes the following subfields: a "protocol" subfield for specifying a version associated with the RTS frame portion; a "type" subfield for indicating a type of the frame (e.g., type=01 for a control frame); a "subtype" subfield for indicating a subtype of the frame (e.g., subtype=1011 indicates an RTS frame); and "ToDS" and "FromDS" subfields to indicate whether a distribution system sends and receives the control frames (e.g., ToDS=0 and FromDS=0 for an RTS frame).

Additionally, the frame control field 310 further includes the following subfields: a "More Fragments" subfield to indicate whether the frame is fragmented (e.g., More Fragments=0 for an RTS frame as it is not fragmented); a "Retry" subfield to indicate whether the frame should be retransmitted if not received (e.g., Retry=0 for an RTS frame as it is not retransmitted); a "Power Management" subfield to indicate a power management state of the sender after conclusion of the current frame exchange; a "More Data" subfield used in management and data frames (e.g., More Data=0 for an RTS frame); a "Protected Frame" subfield to indicate whether the frame is encrypted (e.g., Protected Frame=0 as an RTS frame is not encrypted); and an "Order" subfield to indicate an order of associated frames (e.g., Order=0 for an RTS frame as the frame cannot be transmitted out of order).

The duration field 312 of the RTS portion of the RTS-TRN frame 300 provides an indication of an estimated duration for which the originating device will be communicating with the destination device. Or, in other words, the duration field 312 specifies an estimate of the duration in which the communication medium will be used to effectuate the communication between the originating device and the destination device. The duration may include the following cumulative durations: (1) duration of a Short Interframe Space (SIFS) between the end of the transmission of the RTS frame and the beginning of the transmission of the CTS frame; (2) duration of the CTS frame; (3) duration of another SIFS between the end of the transmission of the CTS frame and the beginning of the transmission of the one or more data frames; (4) duration of the one or more data frames; (5) duration of another SIFS between the end of the transmission of the one or more data frames and the beginning of the transmission of the ACK frame; and (6) duration of the ACK frame. As discussed in more detail further herein, one or more neighboring devices may use the duration to determine whether to estimate potential interference at the originating device based on a proposed transmission scheme.

The receiver address field 314 of the RTS portion of the RTS-TRN frame 300 indicates the address (e.g., media access control (MAC) address) of the destination device. As discussed in more detail, devices that receive the RTS-TRN frame 300 may perform different operations depending on whether the device is the destination device or a non-destination neighboring device. The transmitter address field 316 of the RTS portion of the RTS-TRN frame 300 indicates the address (e.g., MAC address) of the originating device. The frame check sequence field 318 of the RTS portion of the RTS-TRN frame 300 includes a value that allows receiving devices to determine the validity of at least some of the information transmitted via the RTS portion of the RTS-TRN frame 300.

As previously discussed, the control trailer 320 includes at least one of an ISF, $P_t$, or $G_r$–$G_t$. A neighboring device that receives the modified RTS-TRN frame 300 may estimate potential interference at the originating device based on the received power level of the RTS-TRN frame 300, one or more of the information ISF, $P_t$, or $G_r$–$G_t$, its proposed transmit power, and its proposed antenna's own reciprocity factor. The interference is the power level of a signal transmitted by the neighboring device at the input of a receiver of the originating device. If the estimated potential interference at the originating device is too high (e.g., greater than or equal to a threshold), the neighboring device may perform any number of responsive operations, such as withdraw the transmission of the proposed signal, choose a different transmit sector for transmitting the proposed signal, or reduce the transmission power of the proposed signal if that is a suitable option based on whether the signal may be adequately received by a target device.

Based on the ISF, a neighboring device may estimate potential interference at the originating device using the following equation:

$$P_{ra}=P_{rb}+P_{tb}+(G_{tb}-G_{rb})-ISF_a \qquad \text{Equation 1}$$

Where $P_{ra}$ is the potential interference or power level at the receiver input of the originating device, $P_{rb}$ is the power level of the RTS-TRN frame 300 at the receiver input of the neighboring device, $P_{tb}$ is the proposed transmit power of the neighboring device, $G_{tb}$–$G_{rb}$ is the proposed reciprocity factor of the neighboring device, and $ISF_a$ is the interference sensitivity factor of the originating device.

Based on $P_t$ and $G_r$–$G_t$, a neighboring device may estimate potential interference at the originating device using the following equation:

$$P_{ra}=P_{rb}+P_{tb}+(G_{tb}-G_{rb})-P_{ta}+(G_{ra}-G_{ta}) \qquad \text{Equation 2}$$

Where $P_{ta}$ is the transmit power of the originating device, and $G_{ra}$–$G_{ta}$ is the negative of the reciprocity factor of the originating device. That is, the interference sensitivity factor (ISF) is equal to the transmit power $P_t$ plus the reciprocity factor $G_t$–$G_r$.

Based on Pt (and not ISF or $G_r$–$G_t$), a neighboring device may estimate potential interference at the originating device using the following equation:

$$P_{ra}=P_{rb}+P_{tb}+(G_{tb}-G_{rb})-P_{ta} \qquad \text{Equation 3}$$

As indicated, Equation 3 is an abbreviated version of Equation 2. That is, the reciprocity factor of the originating device is missing because it was not communicated to the neighboring device. In such case, the neighboring device may use Equation 3 to estimate the potential interference $P_{ra}$ at the originating device with the assumption that the reciprocity factor of the originating device is zero (0). Alternatively, the neighboring device may make an assumption as to the reciprocity factor of the originating device and use Equation 2 with $G_{ra}$–$G_{ta}$ being an assumed value.

Based on $G_r$–$G_t$ (and not ISF or $P_t$), a neighboring device may estimate potential interference at the originating device using the following equation:

$$P_{ra}=P_{rb}+(G_{tb}-G_{rb})+(G_{ra}-G_{ta}) \qquad \text{Equation 4}$$

As indicated, Equation 4 is an abbreviated version of Equation 2. That is, the difference between the proposed transmit power $P_{tb}$ of the neighboring device and the transmit power $P_{ta}$ of the originating device is missing because $P_{ta}$ was not communicated to the neighboring device. In such case, the neighboring device may use Equation 4 to estimate the potential interference $P_{ra}$ at the originating device with the assumption that the proposed transmit power $P_{tb}$ of the neighboring device is equal to the transmit power $P_{ta}$ of the originating device. Alternatively, the neighboring device may make an assumption as to the difference in the transmit powers and use Equation 2 with $P_{tb}$–$P_{ta}$ being an assumed value. Alternatively, the ISF may be related to the transmit power Pta and the receive sensitivity of the originating device.

Any one of the parameters used to determine the ISF may be based on the transmission and/or reception of a plurality of frames. For example, the originating device may transmit a plurality of frames with different transmit powers. Accordingly, the frames may include different transmit power information in their respective control trailers. Accordingly, the ISF may be determined based on an average of the transmit powers for transmitting the frames, respectively. Alternatively, the ISF may be determined based on a maximum of the transmit powers for transmitting the frames. Alternatively, the ISF may be determined based on all of the transmit powers for transmitting the frames.

The neighboring device may use the information in the duration field 312 to determine a time interval for which the originating device will be communicating with the destination device. If, based on the duration field 312, the originating device and the destination device will be communicating during a proposed communication session between the neighboring device and a target device, the neighboring device may estimate potential interference at the originating device for the purpose of taking an appropriate action if necessary. If, on the other hand, based on the duration field 312, the originating device and the destination device will no longer be communicating during the proposed communication session, the neighboring device need not perform the interference estimate.

As mentioned above, based on the estimate of the potential interference $P_{ra}$ at the originating device, the neighboring device may perform certain operation. For example, if the potential interference $P_{ra}$ is less than (or equal to) a threshold (such that the interference would not be considered significant at the originating device, e.g., may not impact the reception of communications from the destination device by the originating device), the neighboring device may just continue to use the proposed transmission scheme for communicating with a target device. The threshold may be defined as the maximum acceptable interference where the phrase "less than (or equal to) a threshold" as used herein is applicable. Alternatively, the threshold may be defined as the minimum unacceptable interference where the phrase "greater than or equal to" as used herein is applicable.

If the potential interference $P_{ra}$ is greater than or equal to a threshold (such that the interference would be considered significant at the originating device, e.g., may impact the reception of communications from the destination device by the originating device), the neighboring device may take actions to eliminate or reduce the potential interference at the originating device. For example, the neighboring device may withdraw from participating in a communication with the target device. Alternatively, the neighboring device may change the transmission sector (to a lesser optimal sector) for communicating with the target device; the use of the new sector would reduce the estimated interference to less than (or equal to) the threshold. Alternatively, the neighboring device may lower its proposed transmit power to reduce the estimated interference to less than (or equal to) the threshold, as long as the lowered transmit power is acceptable for communicating with the target device.

FIG. 4 illustrates a diagram of exemplary modified Clear to Send (CTS) frame, or CTS-TRN frame 400 in accordance with another aspect of the present disclosure. As previously discussed, a destination device transmits the CTS-TRN frame 400 to an originating device if the communication medium is available for transmission of one or more data frames from the originating device to the destination device.

In particular, the modified CTS-TRN frame 400 comprises a CTS portion including a frame control field 410, a duration field 412, a receiver address field 414, a frame check sequence field 418, and a control trailer 420. Similar to the control trailer 320 of the RTS-TRN frame 300, the control trailer 420 of the CTS-TRN frame 400 includes information that allows a neighboring (non-destination) device to estimate potential interference at the destination device based on a proposed transmission scheme of the neighboring device. Again, such information may include at least one of an interference sensitivity factor (ISF), transmit power $P_t$, or reciprocity factor $G_r$–$G_t$ (the difference in the antenna receive gain and the antenna transmit gain).

For improved communication and interference reduction purposes as discussed in detail in U.S. Provisional Patent application, Ser. No. 62/273,397, the CTS-TRN frame 400 further includes a beam training sequence field 422 for configuring respective antennas of the originating device and one or more neighboring devices. The originating device uses the beam training sequence field 422 to configure its antenna for directional reception from and transmission to the destination device. The one or more neighboring devices uses the beam training sequence field 422 to configure its antenna for transmission so as to reduce interference at the destination device, such as by configuring its transmit antenna radiation pattern to have a null aimed substantially at the direction of the destination device. The beam training sequence in the beam training sequence field 422 may be based on a Golay sequence.

The frame control field 410 of the CTS portion of the CTS-TRN frame 400 includes essentially the same subfields as that of the RTS portion of the RTS-TRN frame 300, as previously discussed. The subfields of the frame control field 410 include the same values as the subfields of the frame control field 310 of the RTS portion of RTS-TRN frame 300, which the exception that the subtype subfield of the frame control field 410 is set to 1100 to indicate a CTS frame (instead of 1011 which indicates an RTS frame).

The duration field 412 of the CTS portion of the CTS-TRN frame 400 provides an indication of a remaining estimated duration for which the originating device will be communicating with the destination device. Or, in other words, the duration field 412 specifies an estimate of the remaining duration in which the communication medium will be used to effectuate the communication between the originating device and the destination device. In particular, the duration field 412 includes the duration indicated in the duration field 312 of the RTS portion of RTS-TRN frame 300, except that it does not include the cumulative durations of the CTS frame and the SIFS immediately before the CTS frame. More specifically, the duration may include the following cumulative durations: (1) duration of a SIFS between the end of the transmission of the CTS frame and the beginning of the transmission of the one or more data frames; (2) duration of the one or more data frames; (3) duration of another SIFS between the end of the transmission of the one or more data frames and the beginning of the transmission of the ACK frame; and (4) duration of the ACK frame.

The receiving address field 414 of the CTS portion of the CTS-TRN frame 400 indicates the address (e.g., MAC address) of the originating device. The frame check sequence field 418 of the CTS portion of the CTS-TRN frame 400 includes a value that allows receiving devices to determine the validity of at least some of the information transmitted via the CTS portion of the CTS-TRN frame 400.

As previously discussed, the control trailer 420 includes at least one of an ISF, $P_t$, or $G_r$–$G_t$. A neighboring device that receives the CTS-TRN frame 400 may estimate potential interference at the destination device based on the received power level of the CTS-TRN frame 400, one or more of the information ISF, $P_t$, or $G_r G_t$, its proposed transmit power, and its proposed antenna's own reciprocity factor per, for example, using a suitable one of Equations 1-4. The neighboring device may perform the potential interference estimate if during a proposed subsequent transmission coincides with the communication session between the originating device and the destination device based on the information in the duration field 412 of the CTS-TRN frame 400.

Similarly, if the estimated potential interference at the destination device is too high (e.g., greater than or equal to a threshold), the neighboring device may perform any number of responsive actions to eliminate or reduce the potential interference at the destination device as previously discussed. For instance, the responsive action may include withdrawing the transmission of a signal so as to eliminate the potential interference at the destination device, choose a different transmission sector for transmitting a signal so as to reduce the potential interference at the destination device, or reduce the transmission power (again to reduce the potential interference at the destination device) if the reduction in the transmit power is still suitable for communicating with a target device.

Figure 5:
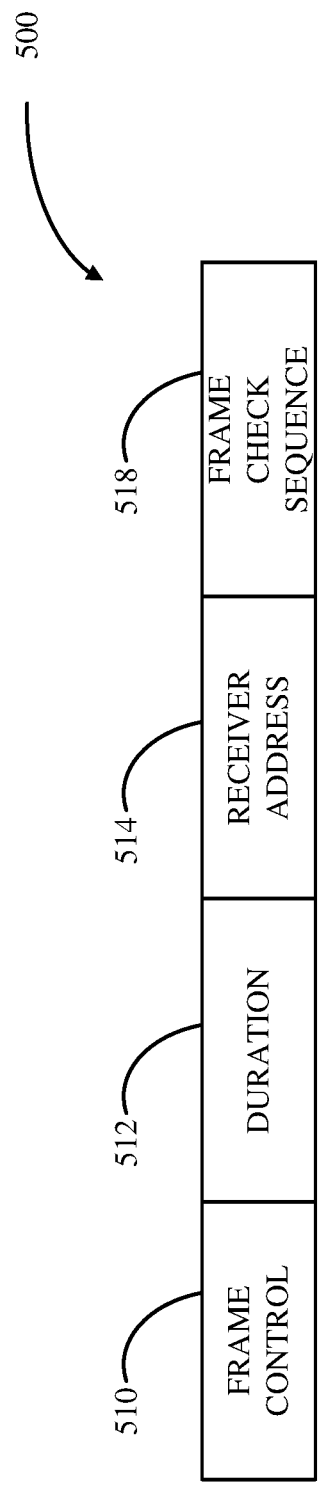
FIG. 5 illustrates a diagram of an exemplary modified acknowledgement (ACK) frame in accordance with another aspect of the present disclosure.

FIG. 5 illustrates a diagram of exemplary ACK frame 500 in accordance with another aspect of the present disclosure. The ACK frame 500 may be configured as a standard ACK frame per IEEE 802.11 protocols. As previously discussed, a destination device transmits the ACK frame 500 to an originating device in response to successfully receiving the one or more data frames from the originating device.

In particular, the ACK frame 500 includes a frame control field 510, a duration field 512, a receiver address field 514, and a frame check sequence field 518. The frame control field 510 of the ACK frame 500 includes essentially the same subfields as that of the RTS-TRN frame 300 and the CTS-TRN frame 400, respectively. The subfields of the frame control field 510 include the same values as the subfields of the frame control fields 310 and 410 of the RTS-TRN frame 300 and the CTS-TRN frame 400, respectively, which the exception that the subtype subfield of the frame control field 510 is set to 1101 to indicate an ACK frame.

The duration field 512 of the ACK frame 500 provides an indication of a remaining estimated duration for which the originating device will be communicating with the destination device. If, for example, the last data frame from the originating device indicates a 0 in the More Fragments subfield of its frame control field, then there are no further data transmissions from the originating device to the destination device. Accordingly, in such case, the duration field 512 indicates a 0 as there are no further communication between the originating device and the destination device once the ACK frame is transmitted. If, on the other hand, the last data frame from the originating device indicates a 1 in the More Fragments subfield of its frame control field, then there are more subsequent data transmissions from the originating device to the destination device. Accordingly, in such case, the duration field 512 indicates an estimate of the remaining duration for which the originating device and the destination device will be communicating after the transmission of the ACK frame. As discussed below, such estimated duration may be used by neighboring devices to determine if it needs to perform an estimate of the potential interference at the originating device for a proposed future transmission.

Figure 6:
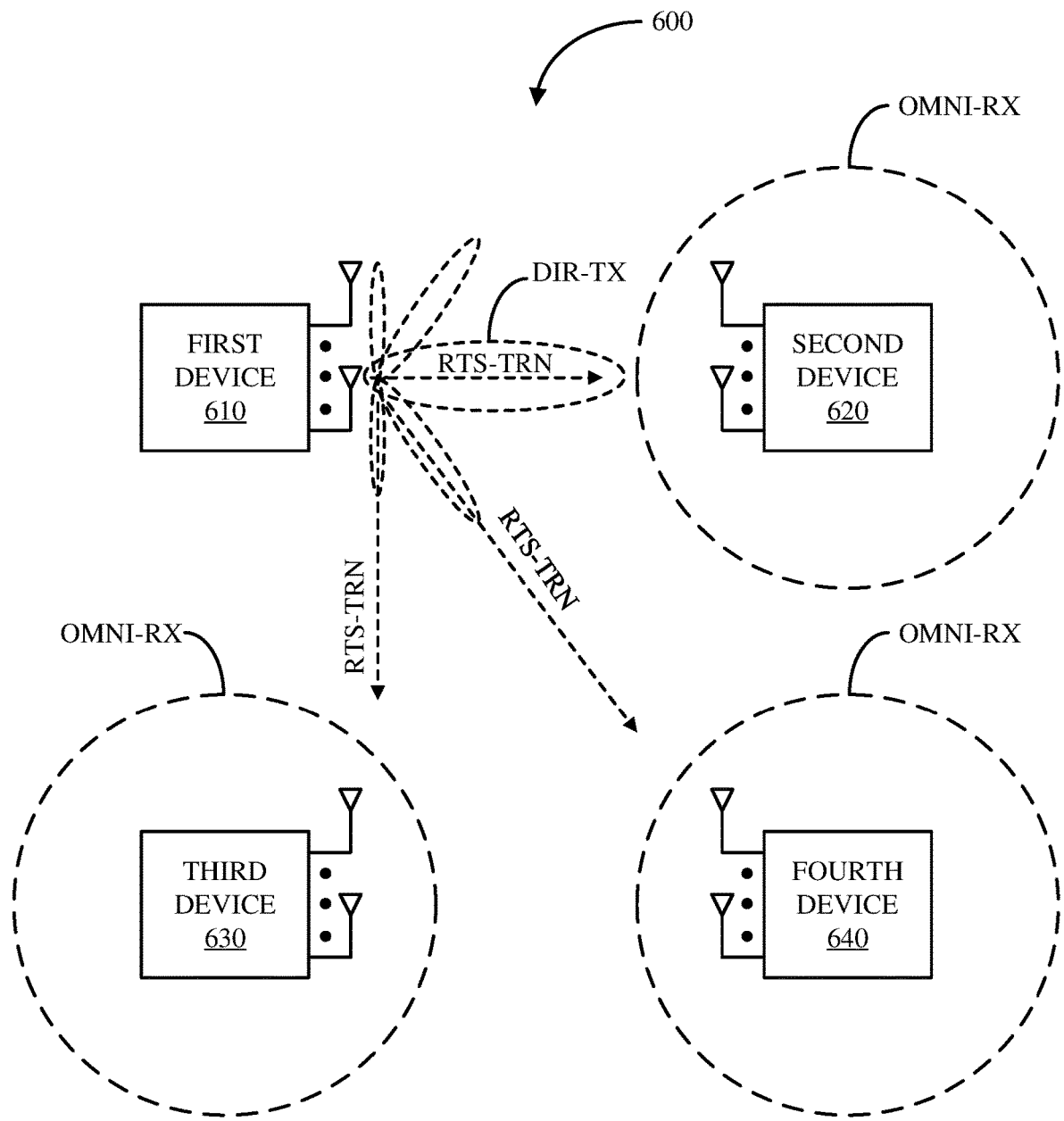
FIG. 6 illustrates a block diagram of an exemplary communication system in a first configuration in accordance with another aspect of the present disclosure.
Figure 7:
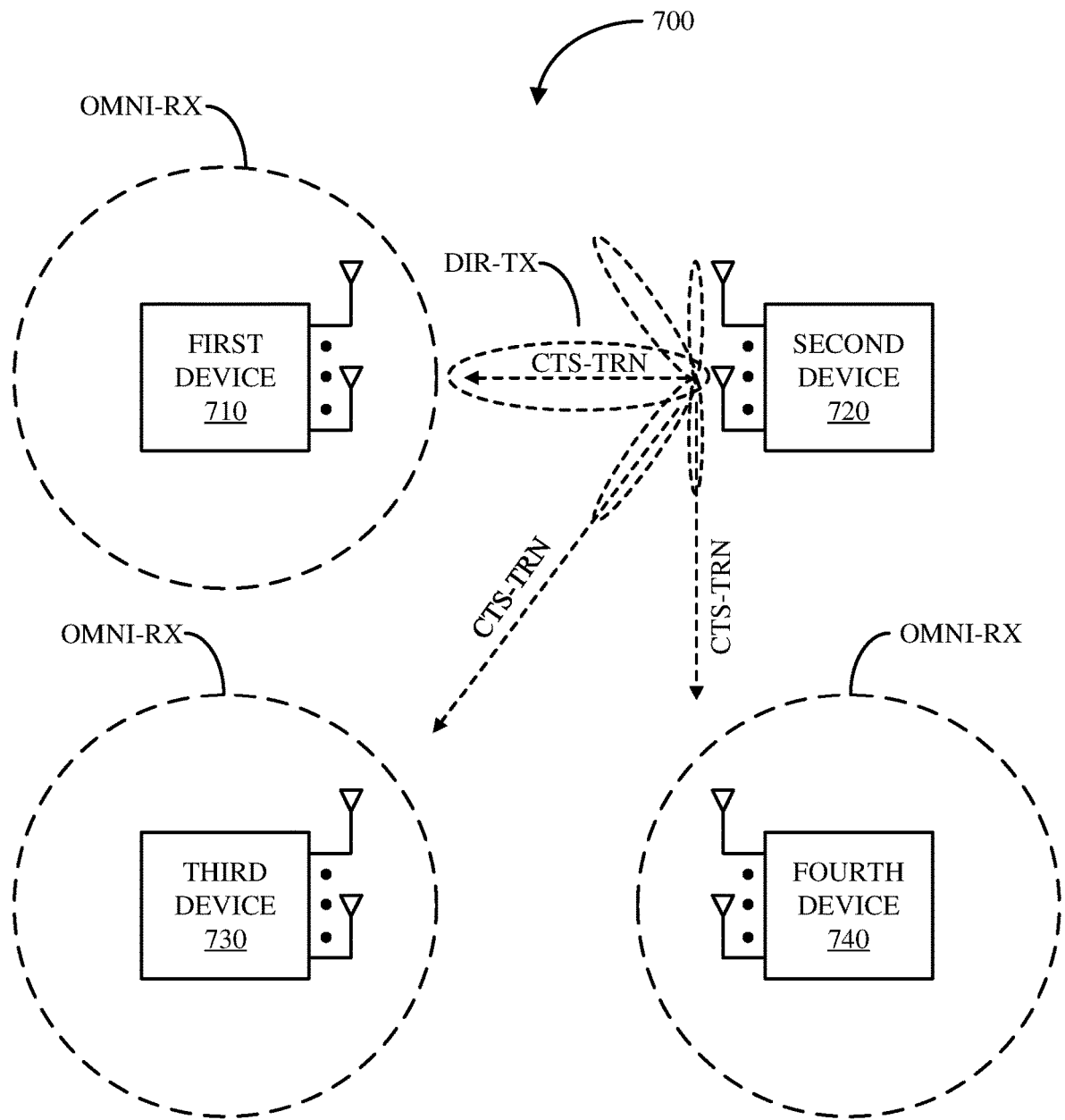
FIG. 7 illustrates a block diagram of an exemplary communication system in a second configuration in accordance with another aspect of the present disclosure.
Figure 8:
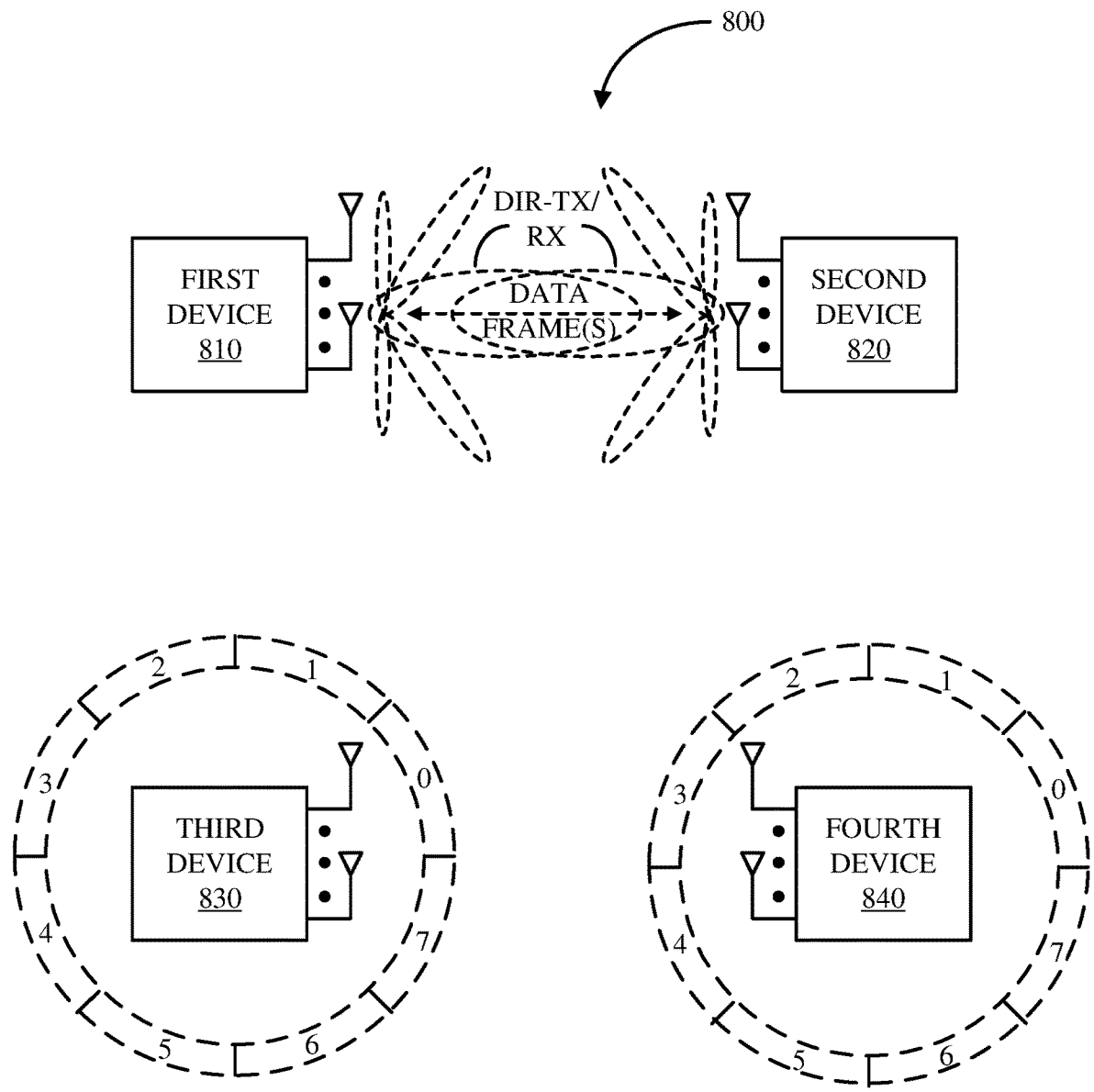
FIG. 8 illustrates a block diagram of an exemplary communication system in a third configuration in accordance with another aspect of the present disclosure.

The following description with reference to FIGS. 6-8 provides examples of how the aforementioned MAC frames, in particular the RTS-TRN frame 300 and the CTS-TRN frame 400, are used to improve communication between an originating device and a destination device, such as by at least eliminating potential interference or reducing actual interference at the originating device and destination device from transmission by neighboring devices.

FIG. 6 illustrates a block diagram of an exemplary communication system 600 in a first configuration in accordance with another aspect of the present disclosure. As illustrated, the communication system 600 includes a plurality of wireless devices, such as a first device 610, a second device 620, a third device 630, and a fourth device 640. In this example, the first device 610 is an example of an originating device that will be transmitting one or more data frames to a destination device, which, in this example, is the second device 620. Also, in this example, the third device 630 is an example of a neighboring device to the first device 610 and the second device 620. Similarly, the fourth device 640 is another example of a neighboring device to the first device 610 and the second device 620.

Each of the first device 610, the second device 620, the third device 630, and the fourth device 640 includes an antenna with multiple antenna elements, allowing each of them to transmit and receive in an omnidirectional manner and in a directional manner. In the first configuration, the first device 610 has configured its antenna for directional transmission (DIR-TX) aimed approximately at the second device 620. The second device 620, the third device 630, and the fourth device 640 have configured their respective antennas for omnidirectional reception (OMNI-RX).

In the first configuration, the first device 610, operating as an originating device, transmits the RTS-TRN frame 300 with the receiver address field 314 indicating the address of the second device 620. In this example, the second device 620, the third device 630, and the fourth device 640 are sufficiently close to the first device 610 to receive the RTS-TRN frame 300. The second device 620 determines that it is the destination device based on the information in the receiver address field 314 in the RTS-TRN frame 300. Similarly, the third device 630 and the fourth device 640 determine that they are not the intended device (but merely neighboring devices to the first device 610) based on the information in the receiver address field 314 in the RTS-TRN frame 300.

As neighboring devices to the first device 610, the third device 630 and the fourth device 640 both receive and store one or more of the information in the duration field 312 and the control trailer 320 of the RTS-TRN frame 300. As discussed, the information in the control trailer 320 includes at least one of the interference sensitivity Factor (ISF), transmit power $P_t$, or reciprocity factor $(G_r–G_t)$ associated with the transmission of the RTS-TRN frame 300 by the first device 610. The third device 630 and the fourth device 640 also measure and store the power levels of the RTS-TRN frame 300 at the inputs of their respective receivers. The stored information may be used in the future to determine whether the third device 630 and/or the fourth device 640 need to estimate the potential interference at the first device 610 based on the information in the duration field 312 of the RTS-TRN frame 300, and if so, estimate the potential interference at the first device 610 based on the information (ISF, $P_t$, and/or $G_r–G_t$) in the control trailer 320 of the RTS-TRN frame 300 and a proposed transmission scheme between the third device 630 and the fourth device 640.

FIG. 7 illustrates a block diagram of the exemplary communication system 700 in a second configuration in accordance with another aspect of the present disclosure. In the second configuration, the second device 720 has determined that it is the destination device and, in response, optionally uses the beam training sequence in the beam training sequence field 322 of the received RTS-TRN 300 to configure its antenna for directional transmission aimed substantially at the first device 710. That is, the antenna of the second device 720 may be configured to generate an antenna radiation pattern with a primary lobe (e.g., highest gain lobe) aimed substantially at the first device 710, and non-primary lobes (e.g., lobes having distinct gains lower than that of the primary lobe) aimed in other directions (e.g., not aimed at the first device 710). In this example, the non-primary lobes are aimed approximately at the third device 730 and fourth device 740, respectively.

In the second configuration, the second device 720 transmits the CTS-TRN frame 400 with its antenna optionally configured for directional transmission aimed substantially at the first device 710. In this example, the first device 710 receives the CTS-TRN frame 400. Also, in accordance with this example, the third device 730 and fourth device 740 both receive the CTS-TRN frame 400. The third device 730 and the fourth device 740 determine that they are not the intended device (but merely neighboring devices to the second device 720) based on the information in the receiver address field 414 in the CTS-TRN frame 400.

As neighboring devices to the second device 720, the third device 730 and the fourth device 740 both receive and store one or more of the information in the duration field 412 and the control trailer 420 of the CTS-TRN frame 400. As discussed, the information in the control trailer 420 includes at least one of the interference sensitivity Factor (ISF), transmit power $P_t$, or reciprocity factor $(G_r–G_t)$ associated with the transmission of the CTS-TRN frame 400 by the second device 720. The third device 730 and the fourth device 740 also measure and store the power levels of the CTS-TRN frame 400 at the inputs of their respective receivers. The stored information may be used in the future to determine whether the third device 730 and/or the fourth device 740 need to estimate the potential interference at the second device 720 based on the information in the duration field 412 of the CTS-TRN frame 400, and if so, estimate the potential interference at the second device 720 based on the information (ISF, $P_t$, and/or $G_r–G_t$) in the control trailer 420 of the CTS-TRN frame 400 and a proposed transmission scheme between the third device 730 and the fourth device 740.

The interference information can be transmitted and received using classes via the CTS-TRN frame 400 and/or the RTS-TRN frame 300. In one embodiment, a class may include one or more bits in a field of the frame. In another embodiment, the class may be defined by an arrangement of fields in the frame. The class may identify the actual interference at a device. Another device receiving the class may determine the actual interference by using a lookup table stored on the other device, or by comparing the received class with values stored in a memory, for example in a central or cloud database.

FIG. 8 illustrates a block diagram of the exemplary communication system 800 in a third configuration in accordance with another aspect of the present disclosure. In the third configuration, the first device 810 determines that it is the intended receiving device of the CTS-TRN frame 400 based on the address indicated in the receiver address field 414 of the CTS-TRN frame 400. In response to determining it is the intended receiving device of the CTS-TRN frame 400, the first device 810 may optionally use the beam training sequence in the beam training sequence field 422 of the received CTS-TRN frame 400 to configure its antenna for directional transmission aimed substantially at the second device 820. That is, the antenna of the first device 810 is configured to generate an antenna radiation pattern with a primary lobe (e.g., highest gain lobe) aimed substantially at the second device 820 and non-primary lobes aimed in other directions.

Also, in the third configuration, the second device 820 may have optionally configure its antenna for directional reception (e.g., primary antenna radiation lobe) aimed at the first device 810, as the second device 820 already knows the direction to the first device 810 based on the beam training sequence in the beam training sequence field 322 of the RTS-TRN frame 300 it has previously received. Thus, while the antenna of the first device 810 is configured for directional transmission to the second device 820, and the antenna of the second device 820 is configured for directional reception from the first device 810, the first device 810 transmits one or more data frames to the second device 820.

While the first device 810 is communicating with the second device 820, the third device 830 decides it needs to communicate with the fourth device 840 (e.g., transmit an RTS frame to the fourth device 840). In response, the third device 830 determines a proposed transmission scheme for transmitting a signal (e.g., an RTS frame) to the fourth device 840. The proposed transmission scheme may include a proposed transmit power $P_t$ and a proposed antenna radiation pattern, which may be characterized by a reciprocity factor $G_t-G_r$. Then, the third device 830 determines whether the first device 810 is currently communicating with the second device 820 based on the information in one or both of the duration fields 312 and 412 in the RTS-TRN frame 300 and CTS-TRN frame 400, respectively. If the third device 830 determines that the first device 810 is no longer communicating with the second device 820 based on one or both of the duration fields 312 and 412, the third device 830 proceeds with transmitting the signal (e.g., the RTS frame) to the fourth device 840 pursuant to the proposed transmission scheme.

If, on the other hand, the third device 830 determines that the first device 810 is still communicating with the second device 820, the third device 830 estimates the respective potential interferences at the first device 810 and the second device 820 that would result if the third device transmits a signal to the fourth device 840 pursuant to the proposed transmission scheme. The third device 830 may estimate the potential interference at the first device 810 using a suitable one of Equations 1-4, the information (e.g., ISF, $P_t$, or $G_r-G_t$) in the control trailer 320 of the RTS-TRN frame 300 received from the first device 810, the power level of the RTS-TRN frame 300 at the input of the receiver of the third device 830, and the transmit power and reciprocity factor of the proposed transmission scheme. Similarly, the third device 830 may estimate the potential interference at the second device 820 using a suitable one of Equations 1-4, the information (e.g., ISF, $P_t$, or $G_r-G_t$) in the control trailer 420 of the CTS-TRN frame 400 received from the second device 820, the power level of the CTS-TRN frame 400 at the input of the receiver of the third device 830, and the transmit power and reciprocity factor of the proposed transmission scheme.

If the third device 830 determines that the respective potential interference estimates at both the first device 810 and the second device 820 are less than (or equal to) a threshold (where the respective interferences would not significantly impact the communications between the first device 810 and the second device 820), the third device 830 proceeds with transmitting the signal (e.g., the RTS frame) to the fourth device 840 pursuant to the proposed transmission scheme.

If, on the other hand, the third device 830 determines that the estimated potential interference at either or both the first device 810 and the second device 820 is greater than or equal to the threshold (where the respective interferences would significantly impact the communications between the first device 810 and the second device 820), the third device 830 may perform a particular action to eliminate or reduce interferences at the first device 810 and the second device 820.

For example, the third device 830 may decide to withdraw the transmission of the signal (e.g., the RTS frame) to the fourth device 840. The third device 830 may withdraw the transmission until the first device 810 and the second device 820 cease communicating with each other based on one or more of the duration fields 312 and 412 in the RTS-TRN frames 300 and CTS-TRN frames 400, respectively. Thus, after the first device 810 and second device 820 cease communicating, the third device 830 may transmit the signal (e.g., an RTS frame) to the fourth device 840 pursuant to the proposed transmission scheme.

Alternatively, the third device 830 may decide to change the transmission sector pursuant to the proposed transmission scheme to reduce the interferences at one or both the first device 810 and the second device 820. For example, the third device 830 may have selected sector "0" for transmission of a signal (e.g., an RTS frame) to the fourth device 840 pursuant to the proposed transmission scheme. However, due to the estimated potential interference at the second device 820 being greater than or equal to the threshold, the third device 830 may decide to select sector "7" for transmission of the signal. In such case, the transmission of the signal via sector "7" results in an estimated potential interference at both the first device 810 and the second device 820 being less than (or equal to) the threshold. In this example, the original estimated interference at the first device 810 may have already been less than (or equal to) the threshold; and thus, the changing of the transmission sector from "0" to "7" is due to the estimated interference at the second device 820, not the first device 810. Accordingly, the third device 830 may proceed with transmitting the signal (e.g., an RTS frame) to the fourth device 840 via sector "7" pursuant to the modified transmission scheme.

As another example of modifying the proposed transmission scheme, the third device 830 may reduce the transmit power of the proposed transmission scheme to reduce the interference at one or both the first device 810 and the second device 820. For example, the transmit power of the proposed transmission scheme may result in the estimated potential interference at the second device 820 being greater than or equal to the threshold. However, as a result of the reduced transmit power, the estimated potential interference at the second device 820 is less than (or equal to) the threshold. Similarly, in this example, the estimated potential interference at the first device 810 may have already been less than (or equal to) the threshold; and thus, the reduction in the transmit power is due to the estimated potential interference at the second device 820, not the first device 810. The third device 830 may now proceed with transmitting the signal (e.g., an RTS frame) to the fourth device 840 with the transmit power of the modified transmission scheme.

In response to receiving the signal (e.g., an RTS frame) from the third device 830, the fourth device 840 determines a proposed transmission scheme for sending a responsive signal (e.g., a CTS frame) to the third device 830. Similarly, the proposed transmission scheme may include a proposed transmit power $P_t$ and a proposed antenna radiation pattern, which may be characterized by a reciprocity factor $G_t$–$G_r$. Then, the fourth device 840 determines whether the first device 810 is currently communicating with the second device 820 based on the information in one or both of the duration fields 312 and 412 in the RTS-TRN frame 300 and the CTS-TRN frame 400, respectively. If the fourth device 840 determines that the first device 810 is no longer communicating with the second device 820 based on one or both of the duration fields 312 and 412, the fourth device 840 proceeds with transmitting the signal (e.g., the CTS frame) to the third device 830 pursuant to the proposed transmission scheme.

If, on the other hand, the fourth device 840 determines that the first device 810 is still communicating with the second device 820, the fourth device 840 estimates the respective potential interferences at the first device 810 and the second device 820 that would result if the fourth device 840 transmits the signal to the third device 830 pursuant to the proposed transmission scheme. The fourth device 840 may estimate the potential interference at the first device 810 using a suitable one of Equations 1-4, the information (e.g., ISF, $P_t$, or $G_r$–$G_t$) in the control trailer 320 of the RTS-TRN frame 300 received from the first device 810, the power level of the RTS-TRN frame 300 at the input of the receiver of the fourth device 840, and the transmit power and reciprocity factor of the proposed transmission scheme. Similarly, the fourth device 840 may estimate the potential interference at the second device 820 using a suitable one of Equations 1-4, the information (e.g., ISF, $P_t$, or $G_r$–$G_t$) in the control trailer 420 of the CTS-TRN frame 400 received from the second device 820, the power level of the CTS-TRN frame 400 at the input of the receiver of the fourth device 840, and the transmit power and reciprocity factor of the proposed transmission scheme.

If the fourth device 840 determines that the respective potential interference estimates at both the first device 810 and the second device 820 are less than (or equal to) a threshold (where the respective interferences would not significantly impact the communications between the first device 810 and the second device 820), the fourth device 840 proceeds with transmitting the signal (e.g., the CTS frame) to the third device 830 pursuant to the proposed transmission scheme.

If, on the other hand, the fourth device 840 determines that the estimated potential interference at either or both the first device 810 and the second device 820 is greater than or equal to the threshold (where the respective interference(s) would significantly impact the communications between the first device 810 and the second device 820), the fourth device 840 may perform a particular action to eliminate or reduce the interferences at the first device 810 and the second device 820.

For example, the fourth device 840 may decide to withdraw the transmission of the signal (e.g., the CTS frame) to the third device 830. The fourth device 840 may withdraw the transmission until the first device 810 and the second device 820 cease communicating with each other based on one or more of the duration fields 312 and 412 in the RTS-TRN frame 300 and the CTS-TRN frame 400, respectively. Thus, after the first device 810 and second device 820 cease communicating, the fourth device 840 may transmit the signal (e.g., the CTS frame) to the third device 830 pursuant to the proposed transmission scheme.

Alternatively, the fourth device 840 may decide to change the transmission sector pursuant to the proposed transmission scheme to reduce the interferences at one or both the first device 810 and the second device 820. For example, the fourth device 840 may have selected sector "3" for transmission of a signal (e.g., a CTS frame) to the third device 830 pursuant to the proposed transmission scheme. However, due to the estimated potential interference at the first device 810 being greater than or equal to the threshold, the fourth device 840 may decide to select sector "4" for transmission of the signal. In such case, the transmission of the signal via sector "4" results in an estimated interferences at both the first device 810 and the second device 820 being less than (or equal to) the threshold. In this example, the original estimated interference at the second device 820 may have already been less than (or equal to) the threshold; and thus, the changing of the transmission sector from "3" to "4" is due to the estimated interference at the first device 810, not the second device 820. Accordingly, the fourth device 840 may proceed with transmitting the signal (e.g., a CTS frame) to the third device 830 via sector "4" pursuant to the modified transmission scheme.

As another example of modifying the proposed transmission scheme, the fourth device 840 may reduce the transmit power of the proposed transmission scheme to reduce the interference at one or both the first device 810 and the second device 820. For example, the transmit power of the proposed transmission scheme may result in the estimated potential interference at the first device 810 being greater than or equal to the threshold. However, as a result of the reduced transmit power, the estimated interference at the first device 810 is less than (or equal to) the threshold. Similarly, in this example, the original estimated interference at the second device 820 may already have been less than (or equal to) the threshold; and thus, the reduction in the transmit power is due to the estimated interference at the first device 810, not the second device 820. The fourth device 840 may now proceed with transmitting the signal (e.g., a CTS frame) to the third device 830 via with the transmit power of the modified transmission scheme. It should be noted that device 610 may correspond to devices 710 and 810. Similarly, devices 620, 630, and 640 may correspond to devices 720 and 820, 730 and 830, and 740 and 840, respectively.

Figure 9:
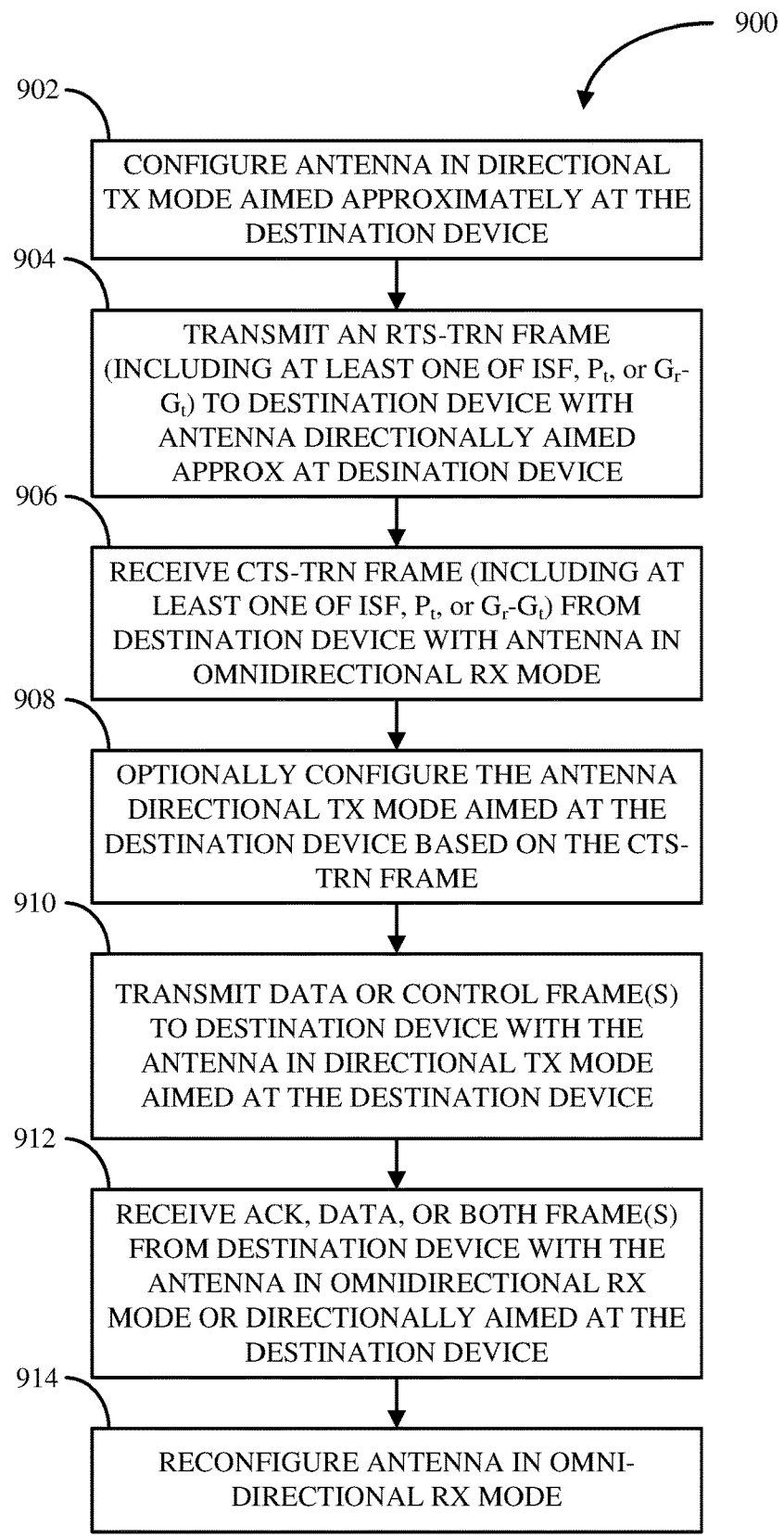
FIG. 9 illustrates a flow diagram of an exemplary method of wirelessly communicating with another device in accordance with certain aspects of the disclosure.

FIG. 9 illustrates a flow diagram of an exemplary method 900 of wirelessly communicating with another device in accordance with certain aspects of the disclosure. The method 900 may be implemented by an originating device, such as the first device (610, 710, 810), which transmits an RTS-TRN frame 300 for communication with a destination device, for example, the second device (620, 720, 820).

The method 900 includes the originating device configuring its antenna for transmitting in a directional manner aimed approximately at a destination device (block 902). For example, the originating device may have previously communicated with or intercepted a transmission from the destination device allowing the originating device to estimate a direction towards the destination device. In this regard, with reference to the access point 110 or access terminal 120 illustrated in FIG. 2, the transmit processor 224 or 264 may configure the transceivers 226a through 226n or 266a through 266n to generate signals for the antennas 230a through 230n or 270a through 270n so that an antenna radiation pattern is generated with a primary lobe aimed approximately at the destination device, respectively. As it is well known, the transceivers 226a through 226n or transceivers 266a through 266n mix the respective signals generated by the transmit processor 224 or 264 with different local oscillator signals having distinct relative amplitude/phases (e.g., also referred to as weights) to produce constructive interference to generate a primary lobe, constructive and destructive interference to generate non-primary lobes, and destructive interference to generate nulls.

The method 900 further comprises generating and transmitting an RTS-TRN 300 (including at least one of the ISF, $P_t$, or $G_r$–$G_t$ in the control trailer 320) to the destination device via the antenna while the antenna is configured for directional transmission aimed approximately at the destination device (block 904). The information (e.g., at least one of the ISF, $P_t$, or $G_r$–$G_t$) in the control trailer 320 is an example of information that may be used by a neighboring (non-destination) device for estimating potential interference at the originating device. In this regard, with reference to the access point 110 or access terminal 120 illustrated in FIG. 2, the transmit data processor 220 or 260 generates the data symbols for the RTS-TRN frame 300 based on data received from a data source 215 or 255. The frame builder 222 or 262 generates the RTS-TRN frame 300 including the data symbols associated with the RTS portion of the RTS-TRN frame 300 and the beam training sequence in the beam training sequence field 322. The transmit processor 224 or 264 acts as an interface for outputting the RTS-TRN frame 300 for transmission to the destination device.

The method 900 further comprises receiving the CTS-TRN frame 400 (including at least one of the ISF, $P_t$, or $G_r$–$G_t$ in the control trailer 420) from the destination device via the antenna while the antenna is configured to receive in an omnidirectional manner (block 906). The information (e.g., at least one of the ISF, $P_t$, or $G_r$–$G_t$) in the control trailer 420 is an example of information that may be used by a neighboring (non-destination) device for estimating potential interference at the destination device. In this regard, with reference to the access point 110 or access terminal 120 illustrated in FIG. 2, the receive processor 242 or 282 may configure the transceivers 226a through 226n or 266a through 266n to configure the antennas 230a through 230n or 270a through 270n to receive signals in an omnidirectional manner, respectively.

The method 900 further comprises optionally configuring the antenna for directional transmission to the destination device based on the beam training sequence in the beam training sequence field 422 of the CTS-TRN frame 400 received from the destination device (block 908). Similarly, with reference to the access point 110 or access terminal 120 illustrated in FIG. 2, the transmit processor 224 or 264 may configure the transceivers 226a through 226n or 266a through 266n to generate signals for the antennas 230a through 230n or 270a through 270n so that an antenna radiation pattern is generated with a primary lobe aimed substantially at the destination device, respectively.

The method 900 further comprises generating and transmitting one or more data or control frames to the destination device via the antenna while the antenna is configured for directional transmission aimed at the destination device (block 910). Similarly, with reference to the access point 110 or access terminal 120 illustrated in FIG. 2, the transmit data processor 220 or 260 generates the data symbols for the one or more data or control frames based on data received from a data source 215 or 255. The frame builder 222 or 262 generates the one or more data or control frames. The transmit processor 224 or 264 acts as an interface for outputting the one or more data or control frames for transmission to the destination device.

The method 900 further comprises receiving one or more ACK, data, or ACK and data frames from the destination device via the antenna while the antenna is configured to receive in an omnidirectional manner or optionally in a directional manner aimed at the destination device (block 912). In this regard, with reference to the access point 110 or access terminal 120 illustrated in FIG. 2, the receive processor 242 or 282 may configure the transceivers 226a through 226n or 266a through 266n to configure the antennas 230a through 230n or 270a through 270n to receive signals in an omnidirectional manner, respectively. Alternatively, the receive processor 242 or 282 may configure the transceivers 226a through 226n or 266a through 266n to configure the antennas 230a through 230n or 270a through 270n to receive signals in a directional manner aimed at the destination device, respectively.

The method 900 further comprises reconfiguring the antenna to receive an in omnidirectional manner once the communications with the destination device has ceased (block 914). In this regard, with reference to the access point 110 or access terminal 120 illustrated in FIG. 2, the receive processor 242 or 282 may configure the transceivers 226a through 226n or 266a through 266n to configure the antennas 230a through 230n or 270a through 270n to receive signals in an omnidirectional manner, respectively.

Figure 10:
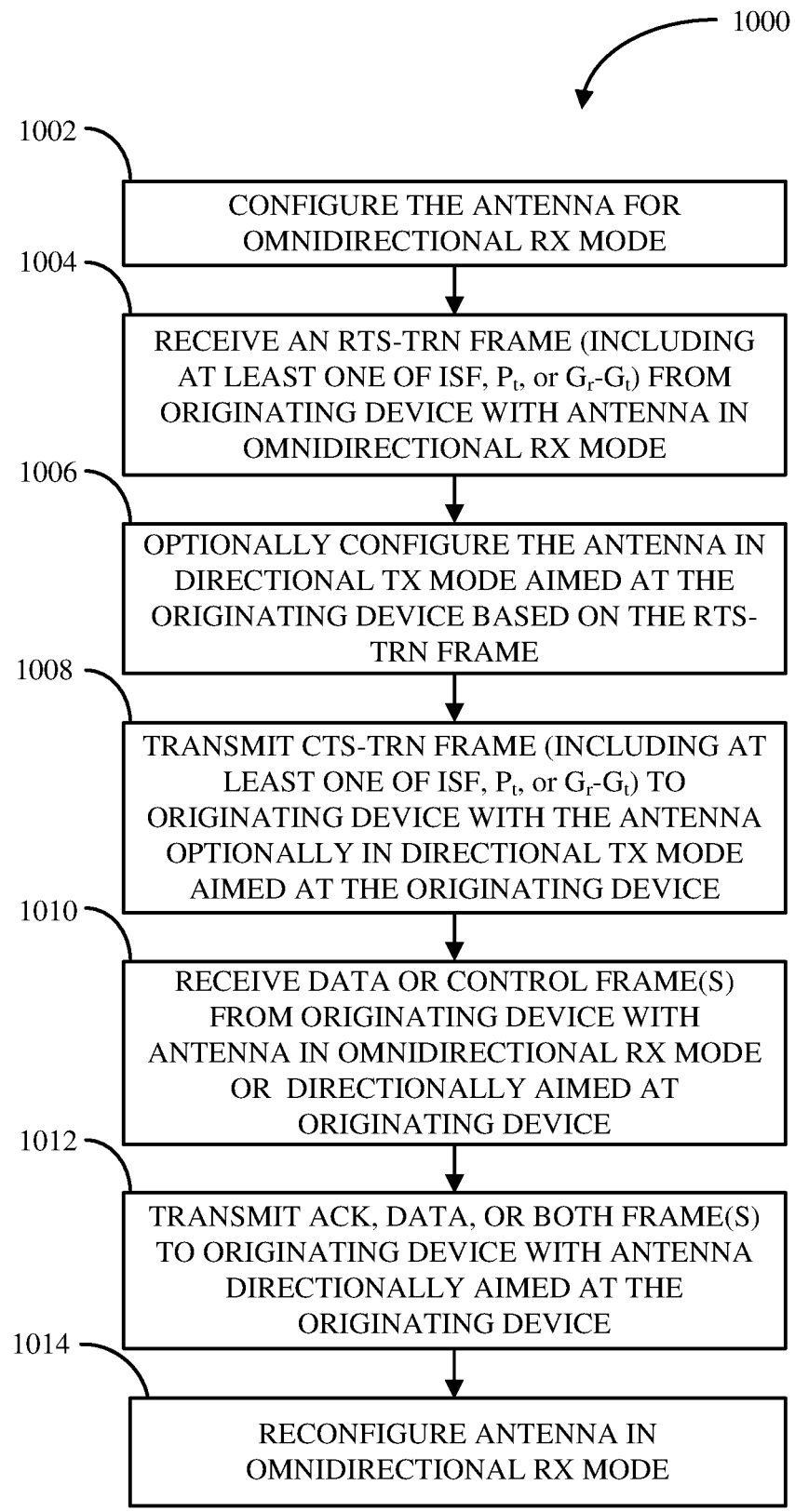
FIG. 10 illustrates a flow diagram of another exemplary method of wirelessly communicating with another device in accordance with certain aspects of the disclosure.

FIG. 10 illustrates a flow diagram of another exemplary method 1000 of wirelessly communicating with another device in accordance with certain aspects of the disclosure. The method 1000 may be implemented by a destination device, such as the second device (620, 720, 820), which transmits the CTS-TRN frame 400 in response to receiving an RTS-TRN frame 300 from an originating device, such as the first device (610, 710, 810).

The method 1000 comprises configuring its antenna for receiving signals in an omnidirectional manner (block 1002). In this regard, with reference to the access point 110 or access terminal 120 illustrated in FIG. 2, the receive processor 242 or 282 may configure the transceivers 226a through 226n or 266a through 266n to configure the antennas 230a through 230n or 270a through 270n to receive signals in an omnidirectional manner, respectively.

The method 1000 further comprises receiving an RTS-TRN frame 300 (including at least one of the ISF, $P_t$, or $G_r$–$G_t$ in the control trailer 320) from the originating device while the antenna is configured to receive in an omnidirectional manner (block 1004). The information (e.g., at least one of the ISF, $P_t$, or $G_r$–$G_t$) in the control trailer 320 is an example of information that may be used by a neighboring (non-destination) device for estimating potential interference at the originating device. In this regard, with reference to the access point 110 or access terminal 120 illustrated in FIG. 2, the receive processor 242 or 282, controller 234 or 274, and receive data processor 244 or 284 operate together to process the received RTS-TRN frame 300 to extract the data from the RTS-TRN frame 300, respectively. The data informs the destination device of the identity of the originating device (e.g., based on the data in the transmitter address field 316 of the RTS-TRN frame 300), that the originating device desires to communicate with the destination device (e.g., based on the data in the frame control field 310 that indicates that the frame is an RTS type frame), and that the destination device is the intended receiver for the RTS-TRN frame 300 (e.g., based on the data in the receiver address field 314 of the RTS-TRN frame 300).

The method 1000 further comprises optionally configuring its antenna for transmitting in a directional manner aimed substantially at the originating device based on the beam training sequence in the beam training sequence field 322 of the received RTS-TRN frame 300 (block 1006). In this regard, with reference to the access point 110 or access terminal 120 illustrated in FIG. 2, the transmit processor 224 or 264 may configure the transceivers 226a through 226n or 266a through 266n to generate signals for the antennas 230a through 230n or 270a through 270n so that an antenna radiation pattern is generated with a primary lobe aimed substantially at the originating device, respectively.

The method 1000 further comprises generating and transmitting the CTS-TRN frame 400 (including at least one of the ISF, $P_t$, or $G_r$–$G_t$ in the control trailer 420) to the originating device via the antenna while the antenna is configured for directional transmission aimed at the originating device (block 1008). The information (e.g., at least one of the ISF, $P_t$, or $G_r$–$G_t$) in the control trailer 420 is an example of information that may be used by a neighboring (non-destination) device for estimating potential interference at the destination device. In this regard, with reference to the access point 110 or access terminal 120 illustrated in FIG. 2, the transmit data processor 220 or 260 generates the data symbols for the CTS-TRN frame 400 based on data received from a data source 215 or 255. The frame builder 222 or 262 generates the CTS-TRN frame 400 including the data symbols associated with the CTS portion of the CTS-TRN frame 400 and the beam training sequence in the beam training sequence field 422. The transmit processor 224 or 264 acts as an interface for outputting the CTS-TRN frame 400 for transmission to the originating device.

The method 1000 further comprises receiving one or more data or control frames from the destination device via the antenna while the antenna is configured to receive in an omnidirectional manner or optionally in a directional manner aimed substantially at the originating device based on the beam training sequence previously received via the RTS-TRN frame 300 (block 1010). In this regard, with reference to the access point 110 or access terminal 120 illustrated in FIG. 2, the receive processor 242 or 282 may configure the transceivers 226a through 226n or 266a through 266n to configure the antennas 230a through 230n or 270a through 270n to receive signals in an omnidirectional manner, respectively. Alternatively, the receive processor 242 or 282 may configure the transceivers 226a through 226n or 266a through 266n to configure the antennas 230a through 230n or 270n through 270n to receive signals in a directional manner aimed at the originating device, respectively. Further, in this regard, with reference to the access point 110 or access terminal 120 illustrated in FIG. 2, the receive processor 242 or 282, controller 234 or 274, and receive data processor 244 or 284 operate together to process the received one or more data or control frames to extract information therefrom, respectively.

The method 1000 further comprises generating and transmitting one or more ACK, data, or ACK and data frames to the originating device via the antenna while the antenna is configured for directional transmission aimed at the originating device (block 1012). Similarly, with reference to the access point 110 or access terminal 120 illustrated in FIG. 2, the transmit data processor 220 or 260 generates the data symbols for the one or more data or control frames based on data received from a data source 215 or 255. The frame builder 222 or 262 generates the one or more data or control frames. The transmit processor 224 or 264 acts as an interface for outputting the one or more data or control frames for transmission to the originating device.

The method 1000 further comprises reconfiguring the antenna to receive an in omnidirectional manner once the communications with the originating device is completed (block 1014). In this regard, with reference to the access point 110 or access terminal 120 illustrated in FIG. 2, the receive processor 242 or 282 may configure the transceivers 226a through 226n or 266a through 266n to configure the antennas 230a through 230n or 270a through 270n to receive signals in an omnidirectional manner, respectively.

Figure 11:
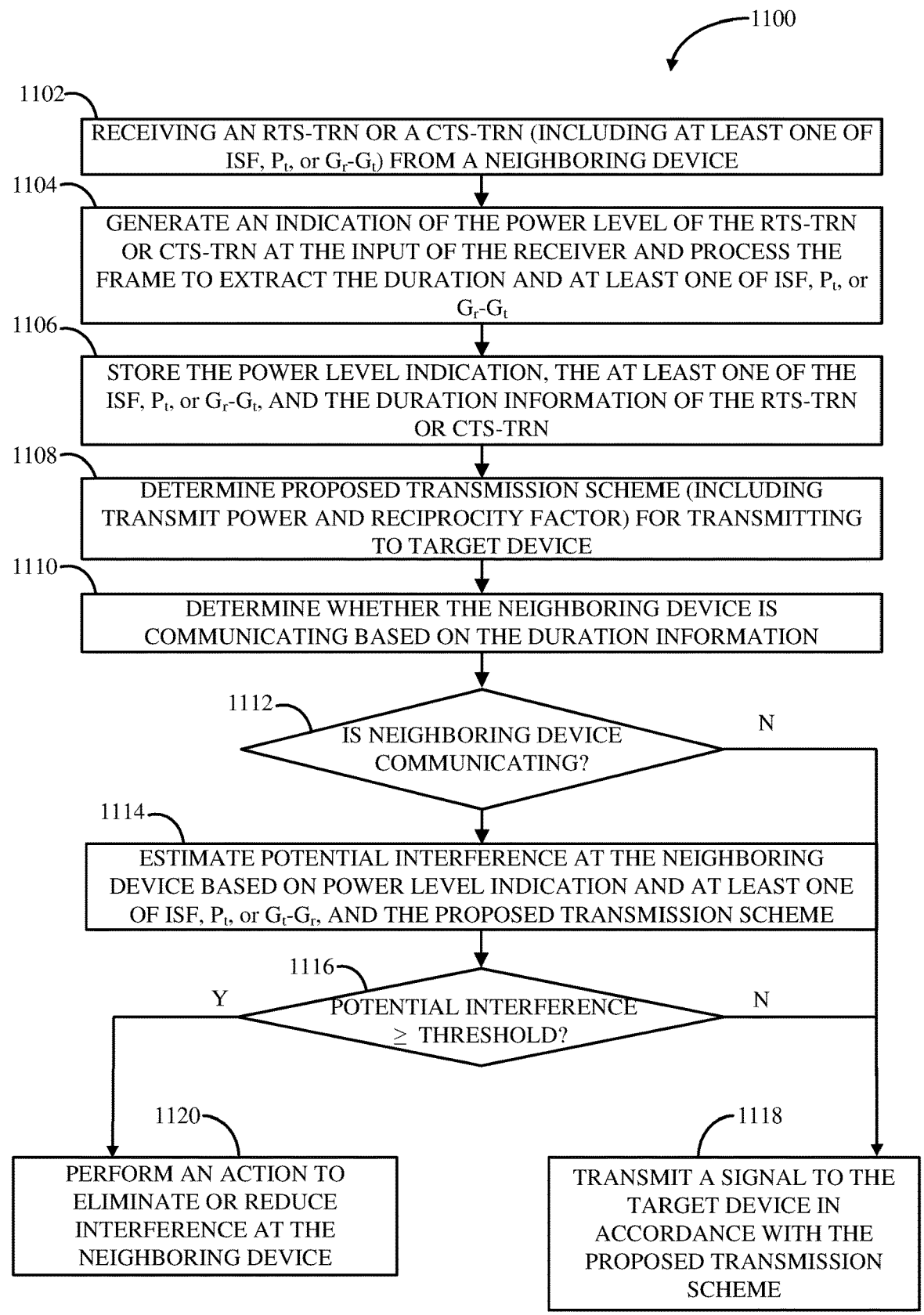
FIG. 11 illustrates a flow diagram of an exemplary method of reducing or eliminating interference at a wireless device in accordance with certain aspects of the disclosure.

FIG. 11 illustrates a flow diagram of an exemplary method 1100 of reducing or eliminating interference at a wireless device in accordance with certain aspects of the disclosure. The method 1100 may be implemented by a neighboring device to an originating device or a destination device. For example, the method 1100 may be implemented at the third device (630, 730, 830) to reduce or eliminate interference at the first device (610, 710, 810) or the second device (620, 720, 820) due to a proposed transmission scheme selected by the third device (630, 730, 830). Similarly, the method 1100 may be implemented at the fourth device (640, 740, 840) to reduce or eliminate interference at the first device (610, 710, 810) or the second device (620, 720, 820) due to a proposed transmission scheme selected by the fourth device (640, 740, 840).

The method 1100 includes receiving an RTS-TRN frame 300 or a CTS-TRN frame 400 from a neighboring device (block 1102). The RTS-TRN frame 300 or CTS frame 400 may have been received via an antenna configured to receive in an omnidirectional manner. In this regard, with reference to the access point 110 or access terminal 120 illustrated in FIG. 2, the receive processor 242 or 282 may have configured the transceivers 226a through 226n or 266a through 266n to configure the antennas 230a through 230n or 270a through 270n to receive signals in an omnidirectional manner, respectively.

The method 1100 further includes generating an indication of the power level of the RTS-TRN frame 300 or CTS-TRN frame 400 at the input of the receiver and processing the frame to extract the duration information in the duration field 312 or 412, and at least one of the ISF, $P_t$, or $G_r$–$G_t$ information in the control trailer 320 or 420 (block 1104). In this regard, the receive processor 242 or 282 may operate together with the controller 234 or 274 to determine the cumulative power level of the RTS-TRN frame 300 or CTS-TRN 400 frame at the inputs of the one or more transceivers 226a through 226n or 266a through 266n. Additionally, the receive processor 242 or 282 may operate together with the controller 234 or 274 and the receive data processor 244 or 284 to extract the duration information and at least one of the ISF, $P_t$, or $G_r$–$G_t$ information from the RTS-TRN frame 300 or the CTS-TRN frame 400.

The method 1100 further includes storing the power level indication, the duration information, and the at least one of the ISF, $P_t$, or $G_r$–$G_t$ information for potential subsequent use in estimating potential interference at the neighboring device transmitting the RTS-TRN frame 300 or the CTS-TRN frame 400 based on a proposed transmission scheme (block 1106). In this regard, the controller 234 or the controller 274 may store the aforementioned information in the memory device(s) 236 or 276, respectively.

The method 1100 further includes determining a proposed transmission scheme (including a transmit power and reciprocity factor) for transmitting a signal (e.g., an RTS frame or CTS frame) to a target device (block 1108). This may be for example the third device (630, 730, 830) selecting a proposed transmission scheme for sending an RTS frame to the fourth device (640, 740, 840); or the fourth device (640, 740, 840) selecting a proposed transmission scheme for sending a CTS frame to the third device (630, 730, 830), as previously discussed. In this regard, the controller 234 or 274 may determine the proposed transmission scheme including a transmit power and the antenna radiation pattern for transmission to the target device. The reciprocity factor is based on the selected antenna radiation pattern.

The method 1100 further includes determining whether the neighboring device, which transmitted the RTS-TRN frame 300 or the CTS-TRN frame 400, is communicating based on the duration information in the duration field 312 or 412, respectively (block 1110). In this regard, the controller 234 or 274 may access the duration information from the memory device(s) 236 or 276 to determine whether the neighboring device is communicating.

If, in block 1112, it is determined that the neighboring device is not communicating, the method 1100 further includes transmitting a signal (e.g., an RTS frame or CTS frame) to the target device in accordance with the proposed transmission scheme (block 1118). In this regard, the data source 215 or 255, transmit data processor 220 or 260, frame builder 222 or 262, transmit processor 224 or 264, transceivers 226a through 226n or 266a through 266n, and antennas 230a through 230n or 270a through 270n operate together to transmit the signal (e.g., an RTS frame or CTS frame) to the target device.

If, on the other hand, in block 1112, it is determined that the neighboring device is communicating, the method 1100 includes estimating potential interference at the neighboring device (that transmitted the RTS-TRN frame 300 or CTS-TRN frame 400) based on at least one of the ISF, $P_t$, or $G_t$–$G_r$, and the proposed transmission scheme (block 1114). For instance, any suitable one of Equations 1-4 may be used to estimate potential interference at the neighboring device. In this regard, the controller 234 or 274 may access the received power level indication of the RTS-TRN frame 300 or CTS-TRN frame 400, at least one of the ISF, $P_t$, or $G_t$–$G_r$, and the transmit power and reciprocity factor of the proposed transmission scheme from the respective memory device(s) 236 or 276, and generate the estimated transmission scheme based on the aforementioned information.

The method 1100 further includes determining whether the estimated potential interference is greater than or equal to a threshold (block 1116). As previously discussed, if the estimated potential interference is greater than or equal to the threshold, then the proposed transmission scheme may adversely impact the communications of the neighboring device associated with the received RTS-TRN frame 300 or CTS-TRN frame 400. On the other hand, if the estimated potential interference is less than (or equal to) the threshold, then the proposed transmission scheme may not adversely impact the communications of the neighboring device associated with the received RTS-TRN frame 300 or CTS-TRN frame 400.

If, in block 1116, it is determined that the estimated potential interference is less than (or equal to) the threshold, the method 1100 further includes transmitting a signal (e.g., an RTS frame or CTS frame) to the target device in accordance with the proposed transmission scheme (block 1118). The operation specified in block 1118 also assumes that the estimated potential interference to the device communicating with the neighboring device is less than (or equal to) the threshold. In this regard, the data source 215 or 255, transmit data processor 220 or 260, frame builder 222 or 262, transmit processor 224 or 264, transceivers 226a through 226n or 266a through 266n, and antennas 230a through 230n or 270a to 270n operate together to transmit the signal (e.g., an RTS frame or CTS frame) to the target device.

If, on the other hand, in block 1116, the estimated potential interference is greater than or equal to the threshold, the method 1100 includes performing an action to eliminate or reduce the potential interference at the neighboring device (block 1120). For example, the device may decide to withdraw the transmission of the signal (e.g., an RTS frame or CTS frame) to the target device. The device may delay the transmission of the signal to the target device until after the neighboring device ceases communicating based on the duration information in the duration field 312 or 412 of the RTS-TRN frame 300 or CTS-TRN frame 400, respectively.

Alternatively, the device may change the proposed transmission scheme to lower the estimated interference at the neighboring device to less than (or equal to) the threshold. For example, the device may change the transmit sector for transmitting the signal (e.g., an RTS frame or CTS frame) so as to reduce the estimated interference to less than (or equal to) the threshold. In this regard, the controller 234 or 274 operates together with the transmit processor 224 or 264 to change the transmit sector. For instance, the device may generate antenna weights vector (AWV) and corresponding transmit power value for generating the signal to reduce the estimated interference to less than (or equal to) the threshold.

As another example, the device may change the transmit power of the proposed transmission scheme to lower the transmit power so as to reduce the estimated interference at the neighboring device to less than (or equal to) the threshold. In this regard, the controller 234 or 274 operates together with the transmit processor 224 or 264 to change the transmit power.

Figure 12:
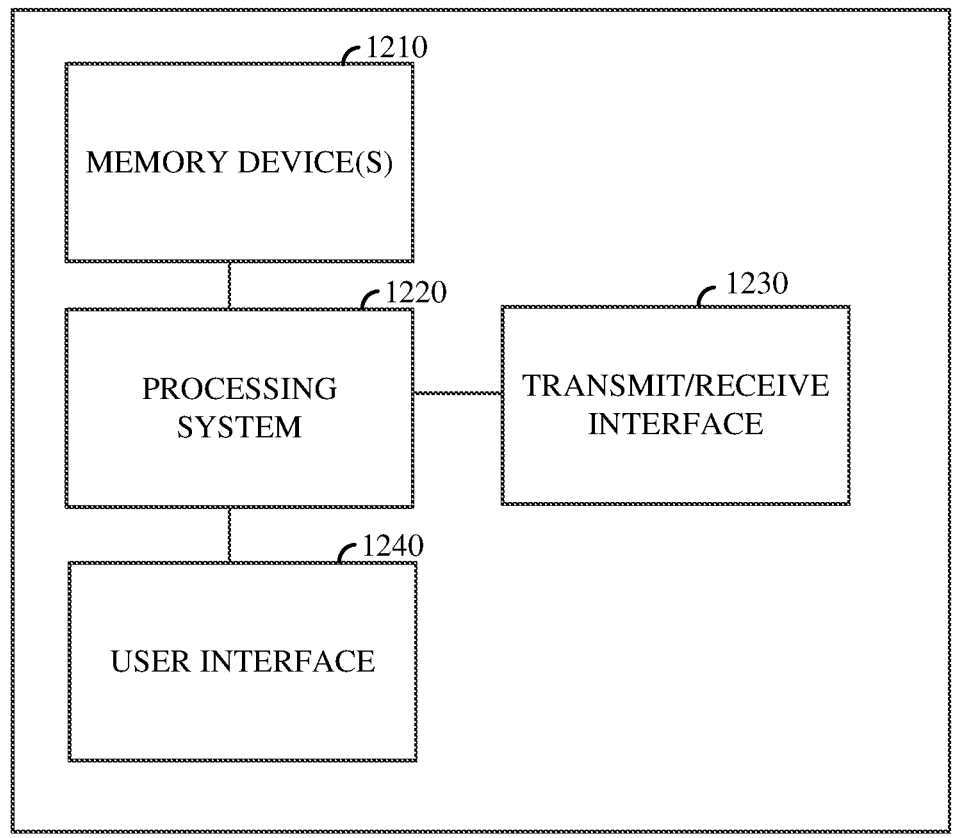
FIG. 12 illustrates a block diagram of an exemplary device in accordance with certain aspects of the present disclosure.

FIG. 12 illustrates an example device 1200 according to certain aspects of the present disclosure. The device 1200 may be configured to operate in an access point (e.g., access point 110) or an access terminal 120 (e.g., access terminal 120a) and to perform one or more of the operations described herein. The device 1200 includes a processing system 1220, and a memory device(s) 1210 coupled to the processing system 1220. In the example of the access point 110, the processing system 1220 may include one or more of the transmit data processor 220, the frame builder 222, the transmit processor 224, the controller 234, the receive data processor 244, and the receive processor 242. Still referring to the example of the access point 110, the memory device(s) 1210 may include one or more of the memory device(s) 236 and the data sink 246. Still referring to the example of the access point 110, the transmit/receive interface may include one or more of the bus interface, the transmit data processor 220, the transmit processor 224, the receive data processor 244, the receive processor 242, the transceivers 226a through 226n, and the antennas 230a through 230n.

In the example of the access terminal 120, the processing system 1220 may include one or more of the transmit data processor 260, the frame builder 262, the transmit processor 264, the controller 274, the receive data processor 284, and the receive processor 282. Still referring to the example of the access terminal 120, the memory device(s) 1210 may include one or more of the memory device(s) 276 and the data sink 286. Still referring to the example of the access terminal 120, the transmit/receive interface 1230 may include one or more of the bus interface, the transmit data processor 260, the transmit processor 264, the receive data processor 284, the receive processor 282, the transceivers 266a through 266n, and the antennas 270a through 270n.

The memory device(s) 1210 may store instructions that, when executed by the processing system 1220, cause the processing system 1220 to perform one or more of the operations described herein. Exemplary implementations of the processing system 1220 are provided below. The device 1200 also comprises transmit/receive circuitry, which may be referred to herein as a transmit/receive interface 1230, coupled to the processing system 1220. The transmit/receive interface 1230 (e.g., interface bus) may be configured to interface the processing system 1220 to a radio frequency (RF) front end, or transmit/receive interface 1230, as discussed further below.

In certain aspects, the processing system 1220 may include one or more of the following: a transmit data processor (e.g., transmit data processor 220 or 260), a frame builder (e.g., frame builder 222 or 262), a transmit processor (e.g., transmit processor 224 or 264) and/or a controller (e.g., controller 234 or 274) for performing one or more of the operations described herein. In these aspects, the processing system 1220 may generate a frame and output the frame to the RF front end for wireless transmission (e.g., to an access point 110 or an access terminal 120).

In certain aspects, the processing system 1220 may include one or more of the following: a receive processor (e.g., receive processor 242 or 282), a receive data processor (e.g., receive data processor 244 or 284) and/or a controller (e.g., controller 234 and 274) for performing one or more of the operations described herein. In these aspects, the processing system 1220 may receive a frame from the RF front end and process the frame according to any one or more of the aspects discussed above.

In the case of an access terminal 120, the device 1200 may include a user interface 1240 coupled to the processing system 1220. The user interface 1240 may be configured to receive data from a user (e.g., via keypad, mouse, joystick, etc.) and provide the data to the processing system 1220. The user interface 1240 may also be configured to output data from the processing system 1220 to the user (e.g., via a display, speaker, etc.). In this case, the data may undergo additional processing before being output to the user. In the case of an access point 110, the user interface 1240 may be omitted.

Figure 13:
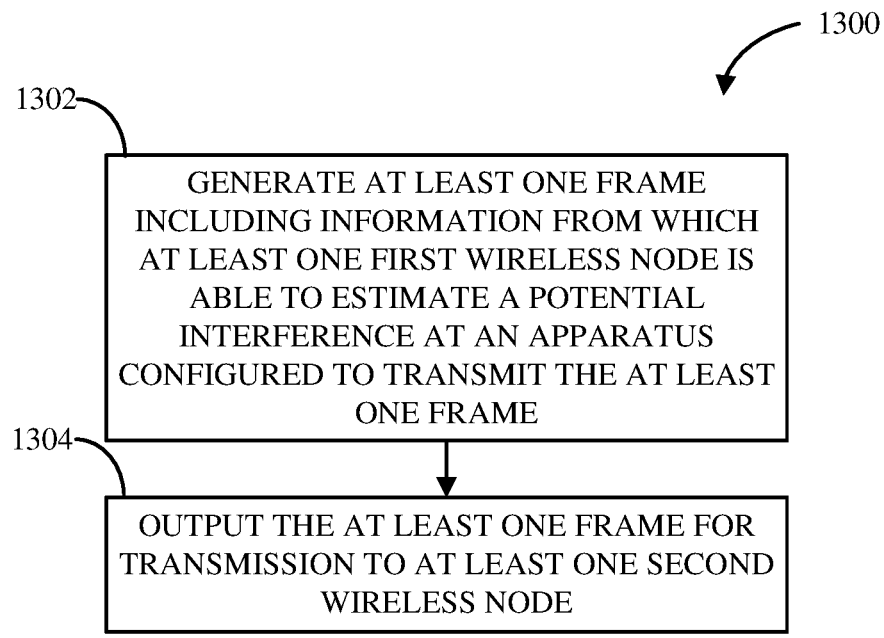
FIG. 13 illustrates a flow diagram of another exemplary method of wirelessly communicating with another device in accordance with certain aspects of the disclosure.

FIG. 13 illustrates an exemplary method 1300 for determining potential interference in accordance with certain aspects of the disclosure. The method 1300 may be implemented by a neighboring device to an originating device or a destination device. For example, method 1300 may be implemented at the third device (630, 730, 830) to reduce or eliminate interference at the first device (610, 710, 810) or the second device (620, 720, 820) due to a proposed transmission scheme selected by the third device (630, 730, 830). Similarly, method 1300 may be implemented at the fourth device (640, 740, 840) to reduce or eliminate interference at the first device (610, 710, 810) or the second device (620, 720, 820) due to a proposed transmission scheme selected by the fourth device (640, 740, 840).

The method includes generating at least one frame including information from which at least one first wireless node is able to estimate a potential interference at an apparatus configured to transmit the at least one frame (block 1302), followed by outputting the at least one frame for transmission to at least one second wireless node (block 1304).

Figure 14:
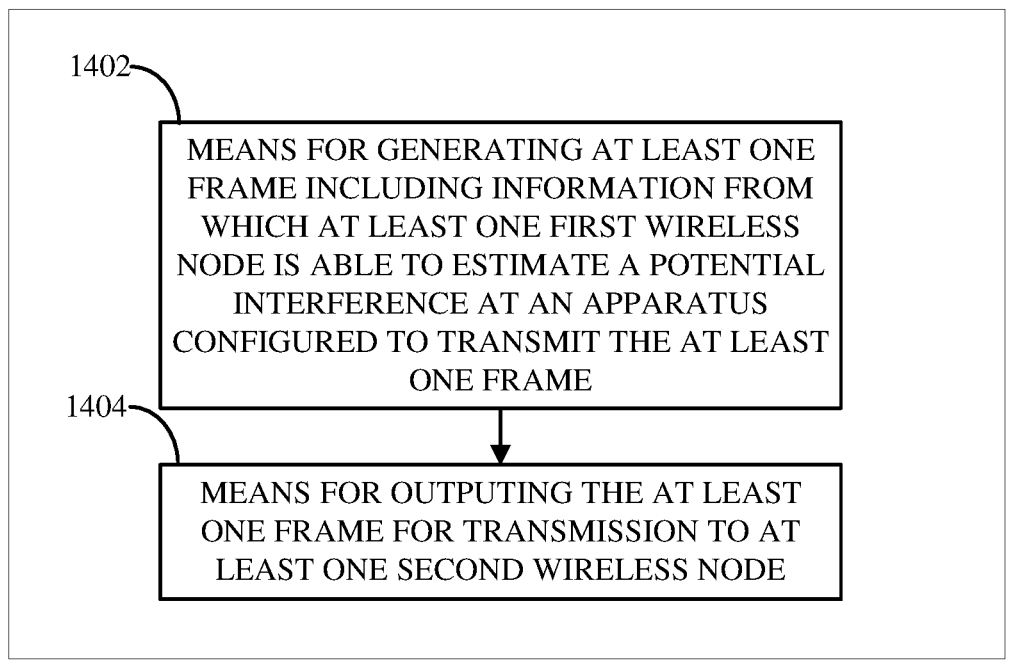
FIG. 14 illustrates components capable of performing the operations shown in FIG. 13, in accordance with certain aspects of the present disclosure.

FIG. 14 illustrates an apparatus for wireless communication 1400 that corresponds to the exemplary method of FIG. 13. The apparatus for wireless communication 1400 may include a means for generating 1402 at least one frame including information from which at least one first wireless node is able to estimate a potential interference at an apparatus configured to transmit the at least one frame. For example, the information may include an additional bit or bits in one or more fields that indicate a potential interference. In another example, the size and field configuration of the frame may be an indication of the potential interference.

The apparatus for wireless communication 1400 may include a means for outputting 1404 that is coupled to the means for generating 1402, configured to output the at least one frame for transmission to at least one second wireless node. For example, the means for generating 1402, e.g., the processing system 1220, may communicate the at least one frame for transmission to the means for outputting 1404, e.g., the transmit/receive interface 1230. The means for outputting 1404 may communicate the at least one frame to another apparatus for wireless communication.

Figure 15:
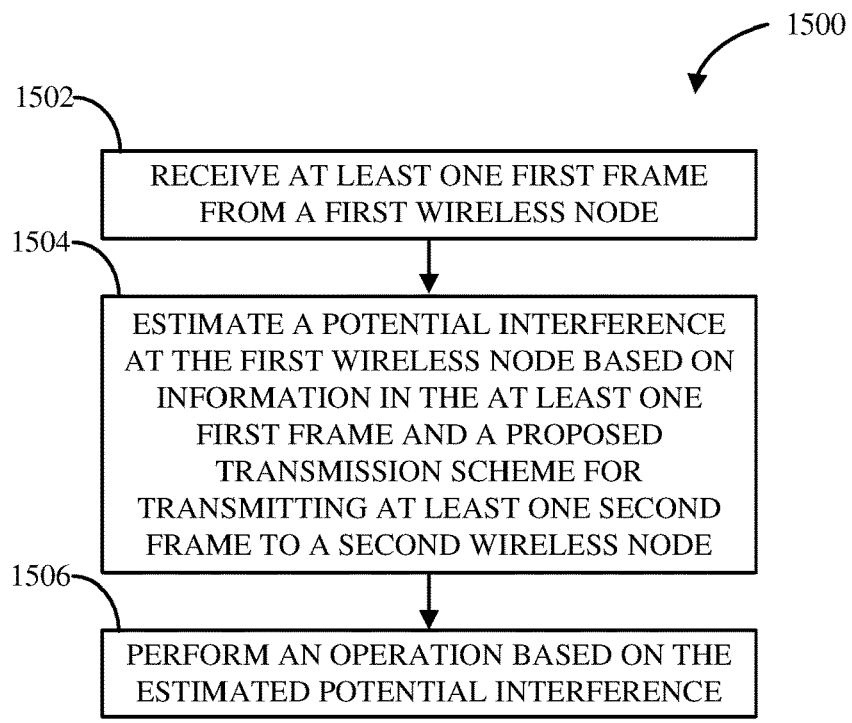
FIG. 15 illustrates a flow diagram of another exemplary method of wirelessly communicating with another device in accordance with certain aspects of the disclosure.

FIG. 15 illustrates an exemplary method 1500 for performing communication operations based on potential interference in accordance with certain aspects of the disclosure. The method 1500 may be implemented by a neighboring device to an originating device or a destination device. For example, method 1500 may be implemented at the third device (630, 730, 830) to reduce or eliminate interference at the first device (610, 710, 810) or the second device (620, 720, 820) due to a proposed transmission scheme selected by the third device (630, 730, 830). Similarly, method 1500 may be implemented at the fourth device (640, 740, 840) to reduce or eliminate interference at the first device (610, 710, 810) or the second device (620, 720, 820) due to a proposed transmission scheme selected by the fourth device (640, 740, 840).

The method includes receiving at least one first frame from a first wireless node (block 1502), estimate a potential interference at the first wireless node based on information in the at least one first frame and a proposed transmission scheme for transmitting at least one second frame to a second wireless node (block 1504), and performing an operation based on the estimated potential interference (block 1506).

Figure 16:
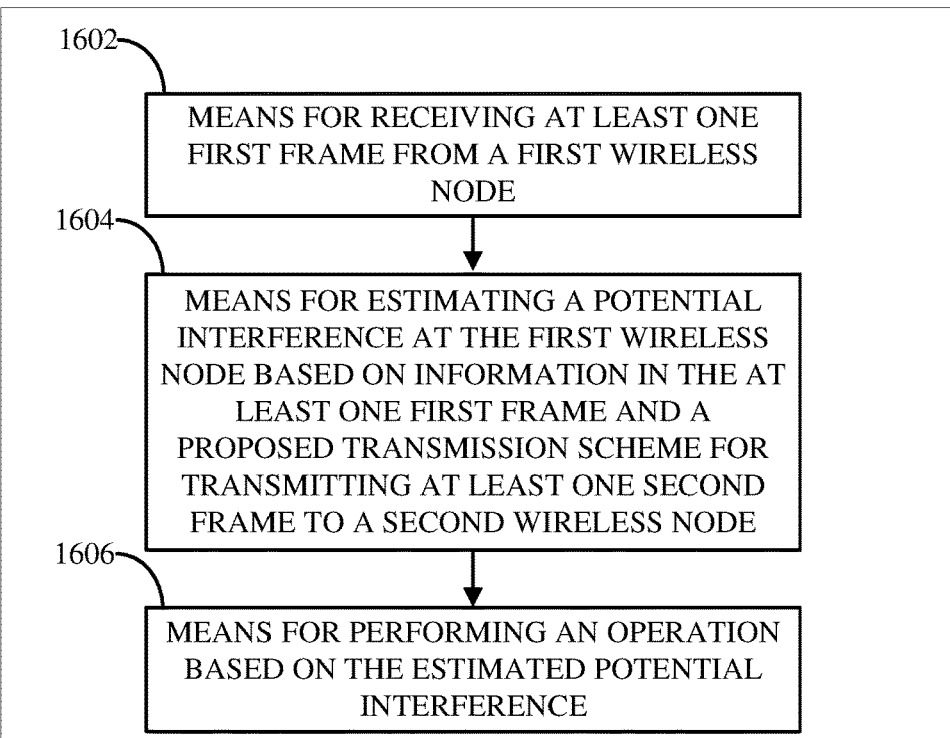
FIG. 16 illustrates components capable of performing the operations shown in FIG. 15, in accordance with certain aspects of the present disclosure.

FIG. 16 illustrates an apparatus for wireless communication 1600 that corresponds to the exemplary method of FIG. 15. The apparatus for wireless communication 1600 may include a means for receiving 1602 at least one first frame from a first wireless node. For example, the means for receiving the at least one first frame may include the transmit/receive interface 1230 which may receive the first frame via a wireless communication with an access point 110 and/or access terminal 120.

The apparatus for wireless communication 1600 may include a means for estimating 1604 a potential interference at the first wireless node based on information in the at least one first frame and a proposed transmission scheme for transmitting at least one second frame to a second wireless node. For example, the means for estimating 1604 may include the processing system 1220 and the memory device(s) 1210. Estimation of a potential interference may include estimation based on known values associated with information (e.g., identifier data, or any other portion of the RTS/CTS portion of the frame) provided in the at least one first frame.

The apparatus for wireless communication 1600 may include a means for performing 1606 an operation based on the estimated potential interference. For example, the means for performing may include the processing system 1220, the memory device(s) 1210, and/or the transmit/receive interface 1230. The performance of the operation may include transmitting, via the transmit/receive interface 1230, data associated with an interference or potential interference at a specific node.

The apparatus for wireless communication 1600 may include a means for performing 1606 an operation based on the estimated potential interference.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 1300 and 1500 illustrated in FIGS. 13 and 15 correspond to means 1400 and 1600 illustrated in FIGS. 14 and 16.

For instance, the controllers (234 and 274) and processing system 1220 are each examples of means for configuring a subset of a plurality of RF receiver chains coupled to respective antennas to receive in an omnidirectional manner. The controllers (234 and 274), receive processors (242 and 282), receive data processors (244 and 284), and processing system 1220 are each examples of means for determining a first energy level of at least one signal received via the subset while the subset of RF receiver chains is configured to receive in the omnidirectional manner. The controllers (234 and 274), receive processors (242 and 282), receive data processors (244 and 284), and processing system 1220 are each examples of means for configuring the plurality of RF receiver chains to directionally receive from a target device based on the first energy level. The controllers (234 and 274), receive processors (242 and 282), receive data processors (244 and 284), and processing system 1220 are each examples of means for determining a second energy level of the at least one signal received via the RF receiver chains while the RF receiver chains are configured to directionally receive from the target device. The controllers (234 and 274) and processing system 1220 are each examples of means for generating data from the at least one signal based on the second energy level.

The processing system 1220 and frame builders (222 and 262) are each examples of means for generating a first frame including a Request to Send (RTS) portion and a first beam training sequence. The transmit/receive interface 1230 and transmit processors (224 and 264) are each examples of means for outputting the first frame for transmission to a device. The transmit/receive interface 1230 and transceivers 226a through 226n and 266a through 266n are each examples of means for configuring an antenna to transmit the first frame in a directional manner. The transmit/receive interface 1230 and transceivers 226a through 226n and 266a through 266n are each examples of means for configuring an antenna to transmit the first frame with an antenna radiation pattern having a primary lobe aimed substantially at the device.

The processing system 1220, transceivers 226a through 226n and 266a through 266n, and receive processors 242 and 282 are each examples of means for receiving a second frame from the device in response to transmitting the first frame, wherein the second frame comprises a Clear to Send (CTS) portion and a second beam training sequence. The processing system 1220 and frame builders (222 and 262) are each examples of means for generating one or more data frames in response to receiving the second frame. The transmit/receive interface 1230 and transmit processors (224 and 264) are each examples of means for outputting the one or more data frames for transmission to the device.

The transmit/receive interface 1230 and transceivers 226a through 226n, 266a through 266n are each examples of means for configuring an antenna to transmit the one or more data frames with an antenna transmission radiation pattern having a primary lobe aimed substantially at the device based on the second beam training sequence. The processing system 1220, transceivers 226a through 226n and 266a through 266n, and receive processors (242 and 282) are each examples of means for receiving one or more acknowledgement (ACK) frames from the device in response to transmitting the one or more data frames. The transmit/receive interface 1230 and transceivers 226a through 226n and 266a through 266n are each examples of means for configuring an antenna to receive the one or more ACK frames 500 with an antenna radiation pattern having a primary lobe aimed substantially at the device based on the second beam training sequence.

The processing system 1220 and frame builders (222 and 262) are each examples of means for generating a first frame including a Clear to Send (CTS) portion and a first beam training sequence. The transmit/receive interface 1230 and transmit processors (224 and 264) are each examples of means for outputting the first frame for transmission to a device. The processing system 1220, controllers (234 and 274), and frame builders (222 and 262) are each examples of means for generating the first frame in response to receiving a Request to Send (RTS) frame from the device.

The transmit/receive interface 1230 and transceivers 226a through 226n and 266a through 266n are each examples of means for configuring an antenna to receive the RTS frame in an omnidirectional manner. The processing system 1220, controllers (234 and 274), and frame builders (222 and 262) are each examples of means for generating the first frame in response to receiving a second frame comprising a Request to Send (RTS) portion and a second beam training sequence. The transmit/receive interface 1230, controllers (234 and 274), and transceivers 226a through 226n and 266a through 266n are each examples of means for receiving one or more data frames from the device in response to transmitting the first frame.

The transmit/receive interface 1230, controllers (234 and 274), and transceivers 226a through 226n and 266a through 266n are each examples of means for configuring an antenna to receive the one or more data frames with an antenna radiation pattern having a primary lobe aimed substantially at the device based on a second frame comprising an RTS portion and a second beam training sequence. The processing system 1220 and frame builders (222 and 262) are each examples of means for generating one or more acknowledgement (ACK) frames 500 in response to receiving the one or more data frames. The transmit/receive interface

1230 and transmit processors (224 and 264) are each examples of means for outputting the one or more ACK frames 500 for transmission to the device. The transmit/receive interface 1230, controllers (234 and 274), and transceivers 226a through 226n and 266a through 266n are each examples of means for configuring an antenna to transmit the one or more ACK frames 500 with an antenna radiation pattern having a primary lobe aimed substantially at the device based on a second frame comprising an RTS portion and a second beam training sequence.

The processing system 1220 and receive processors (242 and 282) are each examples of means for receiving a first frame comprising a first Request to Send (RTS) portion and a first beam training sequence from a first device (610, 710, 810). The transmit/receive interface 1230, controllers (234 and 274), and transceivers 226a through 226n and 266a through 266n are each examples of means for configuring an antenna in a first configuration based on the first beam training sequence. The processing system 1220 and frame builders (222 and 262) are each examples of means for generating a second frame. The transmit/receive interface 1230 and transmit processors (224 and 264) are each examples of means for outputting the second frame for transmission to a second device (620, 720, 820) via the antenna while the antenna is configured in the first configuration.

The processing system 1220 and controllers (234 and 274) are each examples of means for determining a duration in which the first device (610, 710, 810) will be communicating with a third device (630, 730, 830) based on the first RTS portion of the first frame. The transmit/receive interface 1230, controllers (234 and 274), and transceivers 226a through 226n and 266a through 266n are each examples of means for reconfiguring the antenna in a second configuration in response to determining the first device (610, 710, 810) is no longer communicating with the third device (630, 730, 830) based on the duration. The processing system 1220 and frame builders (222 and 262) are each examples of means for generating a third frame. The transmit/receive interface 1230 and transmit processors (224 and 264) are each examples of means for outputting the third frame for transmission to the second device (620, 720, 820) via the antenna while the antenna is configured in the second configuration.

The processing system 1220 and the receive processors (242 and 282) are each examples of means for receiving a third frame including a Clear to Send (CTS) portion and a second beam training sequence from a third device (630, 730, 830). The processing system 1220 and controllers (234 and 274) are each examples of means for determining a duration in which the first device (610, 710, 810) will be communicating with the third device (630, 730, 830) based on at least one of the first RTS portion of the first frame or the CTS portion of the third frame. The transmit/receive interface 1230, controllers (234 and 274), and transceivers 226a through 226n and 266a through 266n are each examples of means for reconfiguring the antenna in a second configuration in response to determining that the first device (610, 710, 810) is no longer communicating with the third device (630, 730, 830) based on the duration. The processing system 1220 and frame builders (222 and 262) are each examples of means for generating a third frame. The transmit/receive interface 1230 and transmit processors (224 and 264) are each examples of means for outputting the third frame for transmission to the second device (620, 720, 820) via the antenna while the antenna is configured in the second configuration.

The processing system 1220 and receive processors (242 and 282) are each examples of means for receiving a first frame comprising a first Clear to Send (CTS) portion and a first beam training sequence from a first device (610, 710, 810). The transmit/receive interface 1230, controllers (234 and 274), and transceivers 226a through 226n and 266a through 266n are each examples of means for configuring an antenna in a first configuration based on the first beam training sequence. The processing system 1220 and frame builders (222 and 262) are each examples of means for generating a second frame. The transmit/receive interface 1230 and transmit processors (224 and 264) are each examples of means for outputting the second frame for transmission to a second device (620, 720, 820) via the antenna while the antenna is configured in the first configuration.

The processing system 1220 and controllers (234 and 274) are each examples of means for determining a duration in which the first device (610, 710, 810) will be communicating with a third device (630, 730, 830) based on the first CTS portion of the first frame. The transmit/receive interface 1230, controllers (234 and 274), and transceivers 226a through 226n and 266a through 266n are each examples of means for reconfiguring the antenna in a second configuration in response to determining the first device (610, 710, 810) is no longer communicating with the third device (630, 730, 830) based on the duration. The processing system 1220 and frame builders (222 and 262) are each examples of means for generating a third frame. The transmit/receive interface 1230 and transmit processors (224 and 264) are each examples of means for outputting the third frame for transmission to the second device (620, 720, 820) via the antenna while the antenna is configured in the second configuration.

In some cases, rather than actually transmitting a frame a device may have an interface to output a frame for transmission (a means for outputting). For example, the processing system 1220 may output a frame, via a bus interface, to the RF front end, otherwise referred to herein as the transmit/receive interface 1230, for transmission. Similarly, rather than actually receiving a frame, a device may have an interface to obtain a frame received from another device (a means for obtaining). For example, a processor may obtain (or receive) a frame, via a bus interface, from an RF front end for reception.

The processing system 1220 and one or more of the transmit processors (224 and 264) and the controllers (234 and 274) are each examples of means for modifying the proposed transmission scheme by changing the transmit power. In certain aspects, the processing system 1220, the transmit data processors (220 and 260), the frame builders (222 and 262), the transmit processors (224 or 264), and/or the controllers (234 and 274) are each examples of a means for performing an operation based on the estimated potential interference. In other aspects, the processing system 1220, the receive processors (242 and 282), the receive data processors (244 or 284), and/or the controllers (234 and 274) are examples of means for performing an operation based on the estimated potential interference. The processing system 1220 and one or more of the transmit processors (224 and 264) and the controllers (234 and 274) are each examples of means for estimating a potential interference at the first wireless node.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and the bus interface. The bus interface may be used to connect a network adapter, among other things, to the processing system via the bus. The network adapter may be used to implement the signal processing functions of the physical (PHY) layer. In the case of an access terminal 120 (for example, see FIGS. 1, 2, and 12), a user interface (e.g., keypad, display, mouse, joystick, etc.) may also be connected to the bus interface. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by an access terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that an access terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An originating wireless node for wireless communications, comprising:
a processing system configured to generate at least one frame including information from which at least one neighboring wireless node is able to estimate a potential interference at the originating wireless node, wherein the information includes an interference sensitivity factor (ISF) related to a transmit power and a reciprocity factor of the originating wireless node; and
an interface configured to output the at least one frame for transmission to at least one destination wireless node.

2. The originating wireless node of claim 1, wherein the transmit power is associated with transmitting the at least one frame to the at least one destination wireless node.

3. The originating wireless node of claim 1, wherein the at least one frame comprises a plurality of frames, and wherein the ISF is related to a plurality of transmit powers for transmitting the plurality of frames, respectively.

4. The originating wireless node of claim 3, wherein the ISF is related to an average or maximum of the plurality of transmit powers for transmitting the plurality of frames.

5. The originating wireless node of claim 1, wherein the reciprocity factor is related to an antenna transmit gain and an antenna receive gain associated with an antenna used for transmitting the at least one frame to and receiving at least one other frame from the at least one destination wireless node, respectively.

6. The originating wireless node of claim 1, wherein the transmit power is associated with transmitting the at least one frame to the at least one destination wireless node and the reciprocity factor is associated with an antenna used for transmitting the at least one frame to and receiving at least one other frame from the at least one destination wireless node, respectively.

7. The originating wireless node of claim 1, wherein the ISF is related to a receive sensitivity for receiving at least one other frame from the at least one destination wireless node.

8. The originating wireless node of claim 1, wherein the information comprises a receive sensitivity for receiving at least one other frame from the at least one destination wireless node.

9. The originating wireless node of claim 1, wherein the information comprises an antenna transmit gain and an antenna receive gain associated with an antenna used for transmitting the at least one frame to and receiving at least one other frame from the at least one destination wireless node, respectively.

10. The originating wireless node of claim 1, wherein the at least one frame comprises a Request to Send (RTS) frame.

11. The originating wireless node of claim 10, wherein the RTS frame comprises a control trailer having the information.

12. The originating wireless node of claim 1, wherein the at least one frame comprises a Clear to Send (CTS) frame.

13. The originating wireless node of claim 12, wherein the CTS frame comprises a control trailer having the information.

14. An originating wireless node, comprising:
a processing system configured to generate at least one frame including information from which at least one neighboring wireless node is able to estimate a potential interference at the originating wireless node, wherein the information includes an interference sensitivity factor (ISF); and
a transmitter configured to transmit the at least one frame to at least one destination wireless node;
wherein the ISF is related to a transmit power factor and reciprocity factor of the originating wireless node.

15. An apparatus for wireless communications, comprising:
an interface configured to receive at least one first frame from a first wireless node; and
a processing system coupled to the interface configured to:
estimate a potential interference at the first wireless node based on information in the at least one first frame and a proposed transmission scheme for transmitting at least one second frame to a second wireless node, wherein the information includes an interference sensitivity factor (ISF) related to a transmit power and reciprocity factor of the first wireless node; and
perform an operation based on the estimated potential interference.

16. The apparatus of claim 15, wherein the transmit power is associated with transmission of the at least one first frame by the first wireless node.

17. The apparatus of claim 15, wherein the at least one first frame comprises a plurality of first frames, and wherein the ISF is related to a plurality of transmit powers for transmitting the plurality of first frames, respectively.

18. The apparatus of claim 17, wherein the ISF is related to an average or maximum of the transmit powers for transmitting the plurality of first frames.

19. The apparatus of claim 15, wherein the reciprocity factor is related to an antenna transmit gain and an antenna receive gain associated with an antenna used for transmitting the at least one first frame and receiving at least one third frame by the first wireless node, respectively.

20. The apparatus of claim 16, wherein the transmit power is associated with transmitting the at least one first frame by the first wireless node and the reciprocity factor is associated with an antenna used for transmitting the at least one first frame and receiving at least one third frame by the first wireless node, respectively.

21. The apparatus of claim 15, wherein the ISF is related to a receive sensitivity for receiving at least one third frame by the first wireless node.

22. The apparatus of claim 15, wherein the information comprises a receive sensitivity for receiving at least one third frame by the first wireless node.

23. The apparatus of claim 15, wherein the information comprises an antenna transmit gain and an antenna receive gain associated with an antenna used for transmitting the at least one first frame and receiving at least one third frame by the first wireless node, and wherein the processing system is configured to estimate the potential interference at the first wireless node based on the information.

24. The apparatus of claim 15, wherein the processing system is further configured to estimate the potential interference at the first wireless node based on a power level of the received at least one first frame.

25. The apparatus of claim 15, wherein the proposed transmission scheme includes the transmit power for transmitting the at least one second frame to the second wireless node, and wherein the processing system is configured to estimate the potential interference at the first wireless node based on the transmit power.

26. The apparatus of claim 15, wherein the proposed transmission scheme includes the reciprocity factor associated with an antenna for transmitting the at least one second frame to and receiving at least one third frame from the second wireless node, and wherein the processing system is configured to estimate the potential interference at the first wireless node based on the reciprocity factor.

27. The apparatus of claim 15, wherein the at least one first frame comprises a Request to Send (RTS) frame or a Clear to Send (CTS) frame, wherein the RTS frame or the CTS frame comprises a control trailer having the information.

28. The apparatus of claim 15, wherein the at least one first frame includes a Request to Send (RTS) frame or a Clear to Send (CTS) frame, wherein the processing system is configured to estimate the potential interference at the first wireless node based on information in a duration field of the RTS frame or CTS frame.

29. The apparatus of claim 15, wherein the operation comprises generating the at least one second frame, and wherein the interface is configured to output the at least one second frame for transmission to the second wireless node in accordance with the proposed transmission scheme if the estimated potential interference is less than or equal to a threshold.

30. The apparatus of claim 15, wherein the operation comprises at least one of generating antenna weights vector (AWV) or transmit power value for transmitting the at least one second frame via a set of antennas in accordance with the proposed transmission scheme, and wherein the interface is configured to output the at least one second frame for transmission to the second wireless node in accordance with the proposed transmission scheme if the estimated potential interference is less than or equal to a threshold.

31. The apparatus of claim 15, wherein the at least one first frame further comprises duration information, and further wherein performing the operation comprises generating the at least one second frame if the estimated potential interference is greater than or equal to a threshold and outputting the at least one second frame for transmission to the second wireless node based on the duration information.

32. The apparatus of claim 15, wherein the operation comprises generating the at least one second frame and modifying the proposed transmission scheme for transmitting the at least one second frame to the second wireless node if the estimated potential interference is greater than or equal to a threshold, and wherein the interface is configured to output the at least one second frame for transmission to the second wireless node in accordance with the modified transmission scheme.

33. The apparatus of claim 32, wherein the proposed transmission scheme includes the transmit power for transmitting the at least one second frame to the second wireless node, wherein the operation comprises generating the at least one second frame and modifying the proposed transmission scheme by changing the transmit power, and wherein the interface is configured to output the at least one second frame for transmission to the second wireless node in accordance with the modified transmission scheme.

34. The apparatus of claim 32, wherein the proposed transmission scheme includes a transmission sector for transmitting the at least one second frame to the second wireless node, wherein the operation comprises generating the at least one second frame and modifying the proposed transmission scheme by changing the transmission sector, and wherein the interface is configured to output the at least one second frame for transmission to the second wireless node in accordance with the modified transmission scheme.

35. The apparatus of claim 32, wherein the proposed transmission scheme includes an antenna weights vector (AWV) for transmitting the at least one second frame to the second wireless node via a set of antennas, wherein the operation comprises generating the at least one second frame and modifying the proposed transmission scheme by changing the AWV, and wherein the interface is configured to output the at least one second frame for transmission to the second wireless node in accordance with the modified transmission scheme.

36. The apparatus of claim 15, wherein the ISF is equal to the transmit power factor plus the reciprocity factor.

37. A wireless node, comprising:
- a receiver configured to receive at least one first frame from a first wireless node; and
- a processing system coupled to the receiver configured to:
  - estimate a potential interference at the first wireless node based on information in the at least one first frame and a proposed transmission scheme for transmitting at least one second frame to a second wireless node, wherein the information includes an interference sensitivity factor (ISF); and
  - perform an operation based on the estimated potential interference;
- wherein the ISF is related to a transmit power factor and reciprocity factor of the first wireless node.

38. The wireless node of claim 37, wherein the ISF is equal to the transmit power factor plus the reciprocity factor.

* * * * *